(12) United States Patent
Xu

(10) Patent No.: US 12,330,056 B2
(45) Date of Patent: Jun. 17, 2025

(54) PROGRAM TRIAL METHOD, SYSTEM, APPARATUS, AND DEVICE, AND MEDIUM

(71) Applicant: TENCENT TECHNOLOGY (SHENZHEN) COMPANY LIMITED, Shenzhen (CN)

(72) Inventor: Zhaobo Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 211 days.

(21) Appl. No.: 17/956,284

(22) Filed: Sep. 29, 2022

(65) Prior Publication Data
US 2023/0013601 A1 Jan. 19, 2023

Related U.S. Application Data

(63) Continuation of application No. PCT/CN2021/117484, filed on Sep. 9, 2021.

(30) Foreign Application Priority Data

Sep. 15, 2020 (CN) .......................... 202010968247.8

(51) Int. Cl.
*A63F 13/35* (2014.01)
*G06Q 30/0241* (2023.01)
(Continued)

(52) U.S. Cl.
CPC ......... *A63F 13/35* (2014.09); *G06Q 30/0277* (2013.01); *H04L 67/60* (2022.05); *H04L 67/535* (2022.05)

(58) Field of Classification Search
CPC ........ H04L 67/60; H04L 67/535; A63F 13/35; A63F 13/355; A63F 13/48; A63F 13/61;
(Continued)

(56) References Cited

U.S. PATENT DOCUMENTS

| | | | |
|---|---|---|---|
| 9,569,466 B1* | 2/2017 | Pacyga | A63F 13/31 |
| 2010/0304860 A1* | 12/2010 | Gault | H04L 65/61 |
| | | | 463/31 |

(Continued)

FOREIGN PATENT DOCUMENTS

| | | | |
|---|---|---|---|
| CN | 105487882 A | 4/2016 | |
| CN | 107667388 A | 2/2018 | |

(Continued)

OTHER PUBLICATIONS

China National Intellectual Property Administration (CNIPA) Office Action 1 for 202010968247.8 Dec. 1, 2020 20 Pages (including translation).

(Continued)

*Primary Examiner* — Benjamin M Thieu
(74) *Attorney, Agent, or Firm* — ANOVA LAW GROUP, PLLC

(57) ABSTRACT

A program trial method includes: displaying a user interface of a host program; displaying a first image frame of a cloud application on the user interface of the host program in response to a trial event being triggered, the first image frame being obtained based on a first output of the cloud application loaded with a trial setting; and displaying a second image frame of the cloud application on the user interface of the host program, the second image frame being obtained based on a second output of the cloud application in response to an operation performed on the user interface.

20 Claims, 21 Drawing Sheets

(51) Int. Cl.
*H04L 67/60* (2022.01)
*H04L 67/50* (2022.01)

(58) Field of Classification Search
CPC ..... A63F 13/69; A63F 13/73; G06Q 30/0277; G06F 3/13; G06F 3/1462; G06F 3/0484; G06F 3/0481; G06F 9/542; G06F 2209/541; G06F 2209/545
See application file for complete search history.

(56) References Cited

U.S. PATENT DOCUMENTS

| | | | | |
|---|---|---|---|---|
| 2012/0278439 | A1* | 11/2012 | Ahiska | A63F 13/77 709/218 |
| 2015/0081764 | A1* | 3/2015 | Zhao | G06F 9/452 709/203 |
| 2016/0030848 | A1* | 2/2016 | Lema | G07F 17/3216 463/9 |
| 2016/0050446 | A1* | 2/2016 | Fujioka | G06F 16/9535 725/93 |
| 2016/0100036 | A1* | 4/2016 | Lo | H04L 67/08 709/203 |
| 2016/0292742 | A1 | 10/2016 | Kang et al. | |
| 2020/0336804 | A1 | 10/2020 | Cui et al. | |
| 2021/0349586 | A1* | 11/2021 | Tsuchikawa | A63F 13/5375 |
| 2022/0362666 | A1* | 11/2022 | Hu | A63F 13/533 |

FOREIGN PATENT DOCUMENTS

| | | |
|---|---|---|
| CN | 109918158 A | 6/2019 |
| CN | 110019961 A | 7/2019 |
| CN | 111603764 A | 9/2020 |
| CN | 111632373 A | 9/2020 |
| CN | 111966275 A | 11/2020 |
| WO | 2019027075 A1 | 2/2019 |
| WO | 2019228120 A1 | 12/2019 |

OTHER PUBLICATIONS

The World Intellectual Property Organization (WIPO) International Search Report for PCT/CN2021/117484 Nov. 26, 2021 7 Pages (including translation).

* cited by examiner

PROGRAM TRIAL METHOD, SYSTEM, APPARATUS, AND DEVICE, AND MEDIUM

CROSS-REFERENCES TO RELATED APPLICATIONS

This application is a continuation application of PCT Patent Application No. PCT/CN2021/117484, entitled "PROGRAM TRIAL METHOD, SYSTEM AND APPARATUS, DEVICE AND MEDIUM" and filed on Sep. 9, 2021, which claims priority to Chinese Patent Application No. 202010968247.8, entitled "PROGRAM TRIAL METHOD, SYSTEM, APPARATUS, AND DEVICE, AND MEDIUM" filed on Sep. 15, 2020, the entire contents of both of which are incorporated herein by reference.

FIELD OF THE TECHNOLOGY

The present disclosure relates to the field of cloud games, and in particular, to a program trial method, system, apparatus, and device, and a medium.

BACKGROUND OF THE DISCLOSURE

To guide a user to download a target program, a program operator will work with an operator of another application to embed introductory information about the target program into the another application. The user learns about the target program by watching introduction or promotional content of the target program, and then the user is guided to download the program.

In a related technology, the introductory information is a text introduction or a video. Taking the video as an example, an operator of a program B creates a program introductory video in advance, and provides the program introductory video to an application program A. When the user performs a specified operation in the application program A or triggers a specified event, the introductory video of the program B is played.

However, the program introductory video needs to be produced frame by frame, and a production manner is too complicated. Once the video is produced, the contents cannot be easily modified. This approach wastes network resources and lacks flexibility in introducing the target program.

SUMMARY

Embodiments of the present disclosure provide a program trial method, system, apparatus, and device, and a medium, so as to conveniently generate an introductory file of a target program. The technical solutions include the following solutions.

According to an aspect of the present disclosure, a program trial method is provided, performed by a terminal and including: displaying a user interface of a host program; displaying a first image frame of a cloud application on the user interface of the host program in response to a trial event being triggered, the first image frame being obtained based on a first output of the cloud application loaded with a trial setting; and displaying a second image frame of the cloud application on the user interface of the host program, the second image frame being obtained based on a second output of the cloud application in response to an operation performed on the user interface. According to another aspect of the present disclosure, a program trial method is provided, performed by a cloud server and including: receiving a trial request transmitted by a trial SDK, and running a specified program logic of a second program to obtain a first trial image frame sequence, the specified program logic including at least one of a program of a specified progress, a program of a specified function, and a program of a specified scenario; the trial request being transmitted by the trial SDK in response to an invoke instruction transmitted by a host program in a running process, the trial request being used for requesting to try the second program, and the host program and the trial SDK running on a same terminal; and transmitting the first trial image frame sequence to the trial SDK, the first trial image frame sequence being used for causing the trial SDK to superimpose and display trial image frames of the first trial image frame sequence on a user interface of the host program; receiving an operation event transmitted by the trial SDK, and controlling the second program to respond to the operation event in real time to obtain a second trial image frame sequence, the operation event being received by the trial SDK on the trial image frame; and transmitting the second trial image frame sequence to the trial SDK, the second trial image frame sequence being used for causing the trial SDK to superimpose and display trial image frames of the second trial image frame sequence on a user interface of the host program.

According to another aspect of the present disclosure, a program trial system is provided, including: a trial SDK and a cloud server; the trial SDK being configured to: transmit a trial request to the cloud server in response to receiving an invoke instruction transmitted by a host program in a running process, the trial request being used for requesting to try a second program, and the host program and the trial SDK running on a same terminal; and the cloud server being configured to receive the trial request, and run a specified program logic of the second program to obtain a first trial image frame sequence, the specified program logic including at least one of a program of a specified progress, a program of a specified function, and a program of a specified scenario; and transmit the first trial image frame sequence to the trial SDK; the trial SDK being further configured to: receive the first trial image frame sequence, and superimpose and display trial image frames of the first trial image frame sequence on a user interface of the host program; the trial SDK being further configured to: receive an operation event on one of the trial image frames, and transmit the operation event to the cloud server; the cloud server being further configured to: receive the operation event, and control the second program to respond to the operation event in real time to obtain a second trial image frame sequence; and transmit the second trial image frame sequence to the trial SDK; and the trial SDK being further configured to: receive the second trial image frame sequence, and superimpose and display trial image frames of the second trial image frame sequence on the user interface of the host program.

According to another aspect of the present disclosure, a computer device is provided, where the computer device includes: a processor and a memory, the memory storing at least one instruction, at least one segment of program, a code set, or an instruction set, and the at least one instruction, at least one segment of program, code set, or instruction set being loaded and executed by the processor to implement the program trial method according to the foregoing aspects.

According to another aspect of the present disclosure, a non-transitory computer-readable storage medium is provided, storing at least one instruction, at least one segment of program, a code set, or an instruction set, and the at least least one instruction, at least one segment of program, code set, or instruction set being loaded and executed by a processor to implement the program trial method according to the foregoing aspects.

The technical solutions provided in the embodiments of the present disclosure include at least the following beneficial effects:

A segment of specified program logic is displayed in a program trial manner to try a function, a segment of progress, or a scenario of the program. In this method, based on a cloud technology, a specified program logic of a trial program is run in a cloud server, and the cloud server generates a trial image frame according to a running result, and transmits the trial image frame to a terminal. A trial SDK on the terminal decodes and displays the trial image frame, so that a picture of the trial program can be displayed on the terminal without installing the trial program. When the terminal receives an operation on a trial picture, the SDK uploads the operation to the cloud server, and the cloud server controls a second program to generate a new trial image frame in response to the operation, so as to implement control and trial of the second program. Compared with an existing video advertisement, the method does not need to produce an introductory video frame by frame and display same video for all viewers, but instead generates and displays a picture by running the target program in real time based on user interactions so that a user can try a part of the target program before downloading/installing the actual program, and users may see different trial images when performing different operations. During production of an introductory file, only a related interface needs to be invoked to run the target program on the cloud server, thereby reducing costs required for the terminal to try the program and improving trial efficiency.

DESCRIPTION OF EMBODIMENTS

To make objectives, technical solutions, and advantages of the present disclosure clearer, the following further describes implementations of the present disclosure in detail with reference to the accompanying drawings.

First, terms involved in the embodiments of the present disclosure are introduced as follows:

Cloud gaming, also referred to as gaming on demand, is an online gaming technology based on the cloud computing technology. The cloud gaming technology enables a thin client with relatively limited graphics processing and data computing capabilities to run a high-quality game. In a cloud gaming scenario, the game is run on the cloud server rather than a game terminal of a player, and the cloud server renders the game scenario into a video and audio stream, and transmits the video and audio stream to the game terminal of the player by using the network. The game terminal of the player is not required to have powerful graphics computing and data processing capabilities, but only required to have a basic streaming media playback capability and the capability of acquiring instructions inputted by the player and sending the instructions to the cloud server.

A software development kit (SDK) usually refers to a set of development kits used by a software engineer for creating application software for a specified software package, a specified software framework, a specified hardware platform, a specified operating system, and the like. The software development tool generally refers to a set of related documents, examples and tools that assist in development of a particular type of software. The software development kit is a set of development tools that are used by software engineers to create application software for a specific software package, software framework, hardware platform, and operating system. Generally speaking, the SDK is an SDK used for developing an application program on a Windows platform. It may simply provide some files of an application programming interface (API) for a program design language, but may also include complex hardware that can communicate with an embedded system. Common tools include utility tools for debugging and other purposes. The SDK also often includes example code, supportive technical notes, or other supporting documents that clarify doubtful points for basic reference materials.

A user interface (UI) control is any visible control or element that can be seen on a user interface of an application program, such as a picture, an input box, a text box, a button, or a label, where some UI controls respond to an operation of a user, such as a download control, and a second program may be downloaded after the download control is triggered. The UI controls involved in the embodiments of the present disclosure include but are not limited to: a download control and a trial control.

Figure 1:
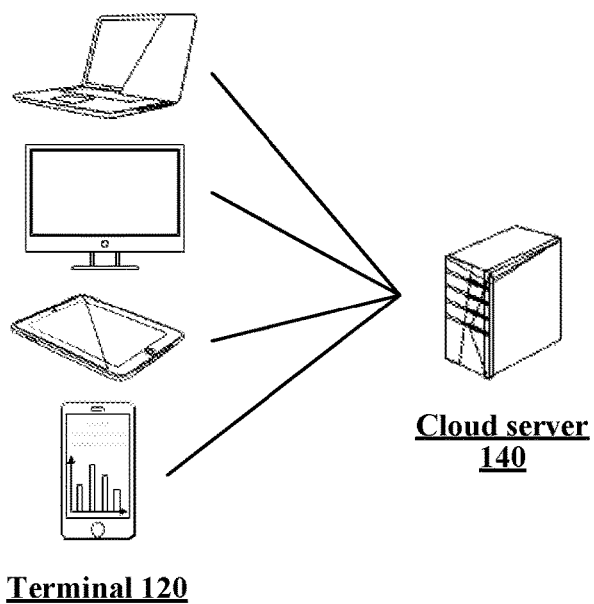
FIG. 1 is a block diagram of a computer system according to an exemplary embodiment of the present disclosure.

FIG. 1 is a schematic structural diagram of a computer system according to an exemplary embodiment of the present disclosure. The computer system includes a terminal 120 and a cloud server 140.

The terminal 120 is connected to the cloud server 140 by using a wired or wireless network.

The terminal 120 may include at least one of a smartphone, a notebook computer, a desktop computer, a tablet computer, a smart box, and an intelligent robot.

The terminal 120 includes a display. The display is used for displaying a trial image frame.

The terminal 120 includes a first memory and a first processor. The first memory stores a first program and a trial SDK. The first program and the trial SDK are invoked and executed by the first processor to implement a program trial method. For example, the first program has an association relationship with the trial SDK. When a program trial function needs to be used, the first program invokes the trial SDK to complete program trial. For example, the trial SDK is embedded in the first program. For example, the first program and the trial SDK run separately in different processes when running. The first memory may include but is not limited to the following several types: a random access memory (RAM), a read only memory (ROM), a programmable read-only memory (PROM), an erasable programmable read-only memory (EPROM), and an electric erasable programmable read-only memory (EEPROM).

The first processor may be one or more integrated circuit chips. In some embodiments, the first processor may be a general-purpose processor, for example, a central processing unit (CPU) or a network processor (NP). In some embodiments, the first processor may invoke the trial SDK to implement the program trial method provided in the present disclosure.

The cloud server 140 includes a second memory and a second processor. The second memory stores a second program, and the second program is invoked by the second processor to implement the program trial method provided in the present disclosure. For example, the second memory may include but is not limited to the following several types: a RAM, a ROM, a PROM, an EPROM, and an EEPROM. For example, the second processor may be a general-purpose processor, such as a CPU or an NP.

The cloud server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smart watch, or the like, but is not limited thereto. The terminal and the cloud server may be directly or indirectly connected in a wired or wireless communication manner. This is not limited in the present disclosure.

In one embodiment, the computer system further includes a management background, and the management background is a computer device. For example, the management background may be at least one of a desktop computer, a smartphone, a notebook computer, a tablet computer, a smart box, and an intelligent robot. The management background and the cloud server 140 are interconnected by using a wired or wireless network. The management background is used for managing the cloud server, configure relevant parameters and upload data for the cloud server.

Figure 2:
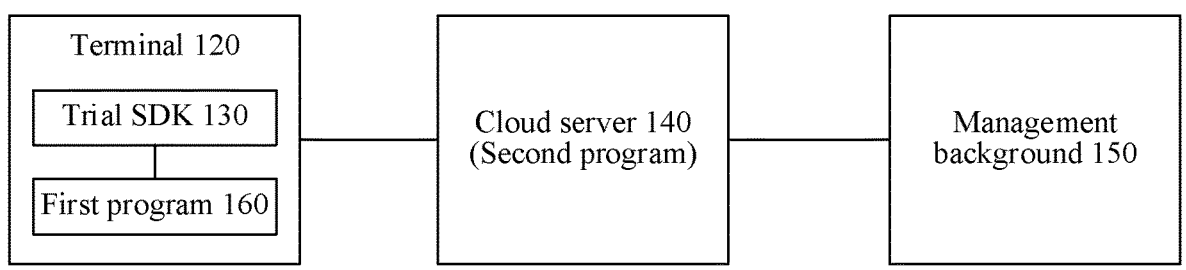
FIG. 2 is a block diagram of a computer system according to another exemplary embodiment of the present disclosure.

For example, FIG. 2 is a schematic structural diagram of a computer system according to another exemplary embodiment of the present disclosure. The computer system includes: a terminal 120, a cloud server 140, and a management background 150. The terminal 120 runs a first program 160 and a trial SDK 130. For example, the first program 160 is embedded with a trial SDK 130, and the first program 160 invokes the trial SDK 130 by using an invoke instruction, so as to exchange data with the cloud server 140 by using the trial SDK 130. A second program runs on the cloud server 140. For example, the terminal 120 and the cloud server 140 are interconnected by using a wired or wireless network. The cloud server 140 and the management background 150 are interconnected by using a wired or wireless network.

For example, in one embodiment, the cloud server 140 includes three physical servers: an advertisement server, a running server, and a configuration server. The three physical servers implement the program trial method provided in the present disclosure. For example, the three physical servers may share one database, or each physical server may be configured with one database. The advertisement server and the running server are connected to each other by using a wired or wireless network, the running server and the configuration server are connected to each other by using a wired or wireless network, and the advertisement server and the configuration server are connected to each other by using a wired or wireless network. For example, the management background and the three physical servers are interconnected by using a wired or wireless network. The terminal is connected to the advertisement server by using a wired or wireless network, and the terminal is connected to the running server by using a wired or wireless network.

Certainly, composition of the cloud server 140 is not limited to the foregoing three physical servers, and the cloud server may include more or fewer physical servers to implement the program trial method provided in the present disclosure.

Figure 3:
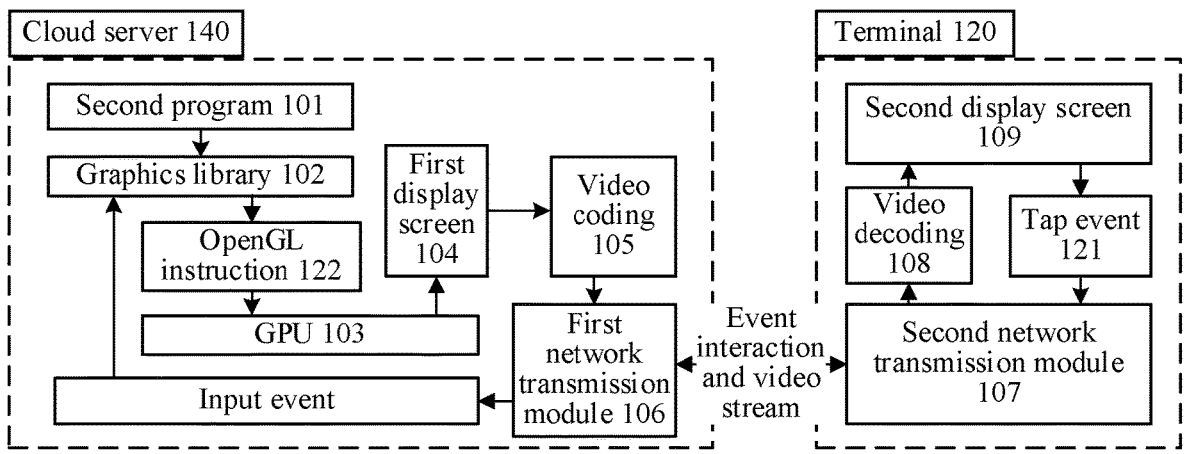
FIG. 3 is a block diagram of a computer system according to another exemplary embodiment of the present disclosure.

For example, a module division manner in the cloud server and the terminal is provided. FIG. 3 is a schematic structural diagram of a computer system according to another exemplary embodiment of the present disclosure. The computer system includes: a cloud server 140 and a terminal 120.

The cloud server 140 runs a second program, and the second program 101 generates a trial image frame (program picture) of the second program 101 on a first display screen 104 by using a graphics library 102 and a graphics processing unit (GPU) 103. Then video coding 105 is performed on the trial image frame to generate video data, and the video data is transmitted to the terminal 120 by using a first network transmission module 106. The terminal 120 receives, by using a second network transmission module 107, the video data transmitted by the server, performs video decoding 108 on the received video data, and displays a decoded trial image frame on a second display screen 109. When receiving a tap event 121 (operation event) on the trial image frame, the terminal 120 transmits the tap event 121 to the cloud server 140 by using the second network transmission module 107. The cloud server receives the tap event 121 by using the first network transmission module 106, inputs the tap event 121 into the graphics library 102 of the second program 101, generates an open graphics library (OpenGL) instruction 122 according to the tap event 121, and the GPU 103 generates a trial image frame of the second program 101 according to the OpenGL instruction 122, and then transmits the new trial image frame to the terminal 120 for display by using video coding 105 and the first network transmission module 106 to form a video stream.

For example, the program trial method provided in the present disclosure may be used in scenarios such as program trial, program promotion, and program advertisement.

For example, in the embodiments provided in the present disclosure, steps performed by the trial SDK may be further understood as being performed by the first program embedded with the trial SDK, or may be understood as being performed by the terminal.

Figure 4:
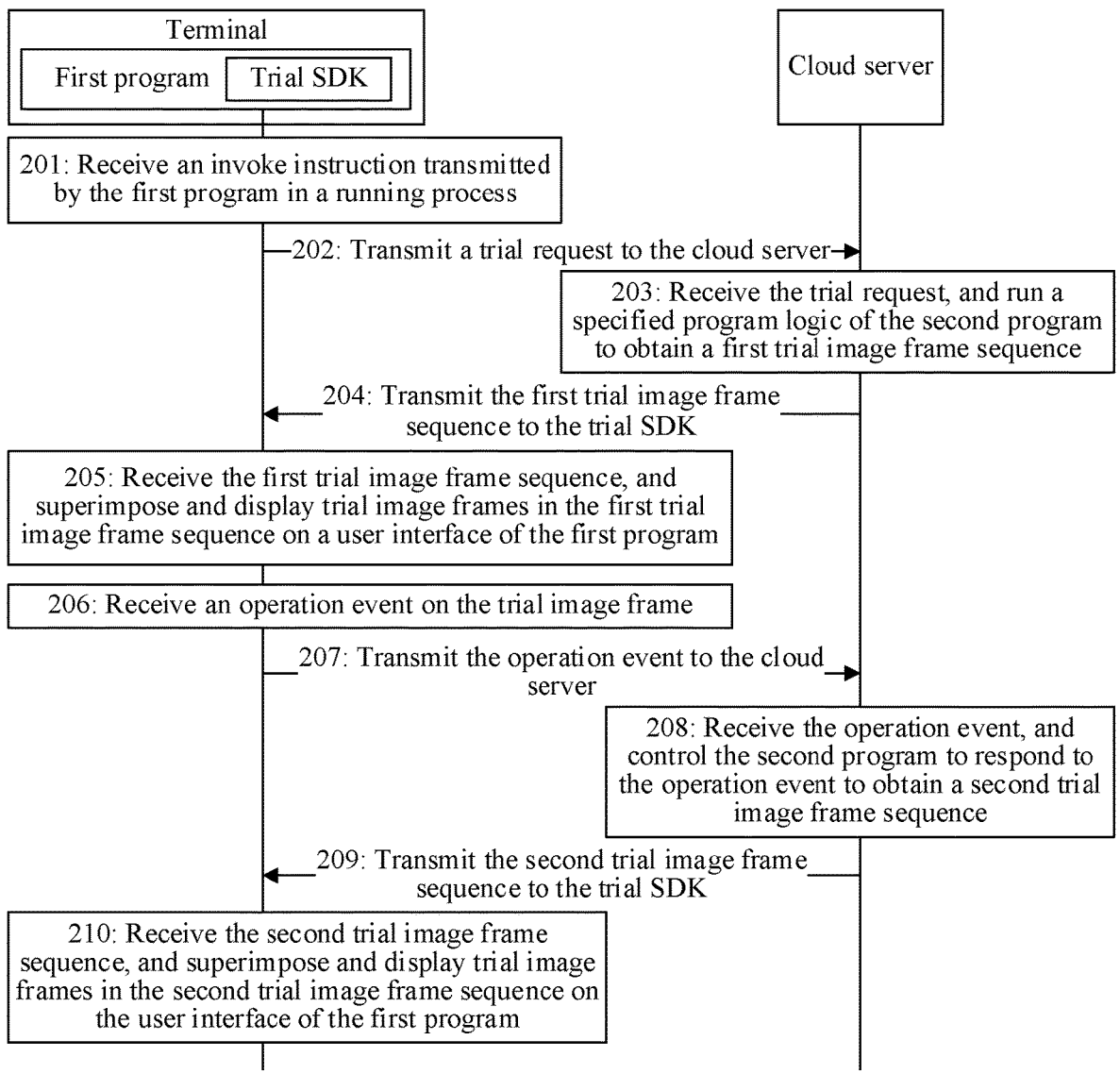
FIG. 4 is a flowchart of a program trial method according to another exemplary embodiment of the present disclosure.

FIG. 4 is a flowchart of a program trial method according to another exemplary embodiment of the present disclosure. The method may be performed by the computer system shown in FIG. 1, FIG. 2, or FIG. 3. The computer system includes: a terminal and a cloud server, where a first program and a trial SDK are running on the terminal. The method includes the following steps.

Step 201: The trial SDK receives an invoke instruction transmitted by the first program in a running process.

For example, the first program and the trial SDK run on the same terminal, and the first program runs on the terminal. The first program is a host program and the terminal is configured to display a user interface of the host program. When the first program needs to try a second program, the first program invokes the trial SDK, and performs data exchange with the cloud server by using the trial SDK to obtain a running picture (trial image frame) of the second program. For example, the first program is associated with the trial SDK, the trial SDK is embedded in the first program, and the first program invokes the trial SDK by using an invoke instruction. For example, the trial SDK provides an API applicable to a plurality of operating systems, that is, the trial SDK may be embedded in any program to provide a program trial function for the program.

For example, the first program and the trial SDK run in different processes. For example, the first program runs in a first process. When the first program needs to try the second program, the first program transmits an invoke instruction, starts the trial SDK, and the trial SDK runs in a second process, so that the trial SDK transmits a trial request to the cloud server.

For example, when the method is used for implementing an introductory material (e.g., an advertisement) of trying the second program, the first program is a host program of the advertisement, the trial SDK is an advertisement SDK or a trial SDK, and the second program is a target program corresponding to the introductory material (e.g., the target program can be a program to be promoted). For example, the second program is a cloud application loaded with a trial setting. The cloud application may be loaded on a cloud server.

For example, the invoke instruction is used for starting the trial SDK, and the trial request is transmitted to the cloud server by using the trial SDK. For example, the invoke instruction includes related information required for requesting to try the second program. For example, the invoke instruction includes: at least one of a program identifier of the first program, a current running scenario of the first program, an advertisement identifier, an advertisement type, and a program identifier of the second program.

For example, when a trial event is triggered in the first program, the first program transmits the invoke instruction to the trial SDK. The trial event may be any event occurring in the first program. For example, the trial event may be a specified trigger operation performed by a user, or the first program automatically triggers the specified event.

Figure 5:
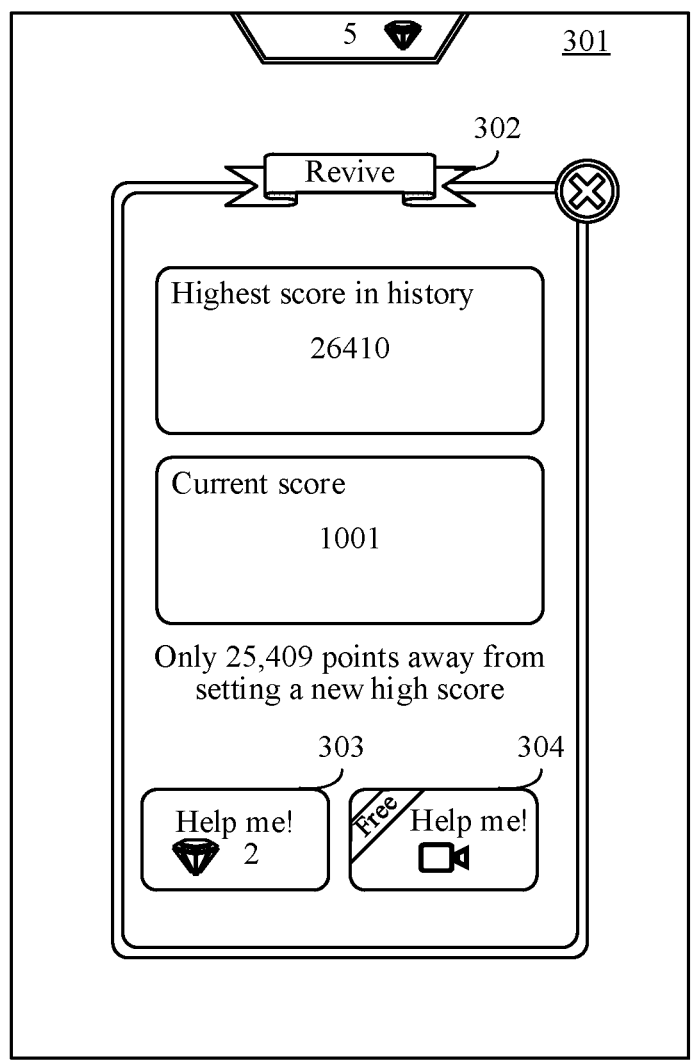
FIG. 5 is a schematic diagram of a user interface of a program trial method according to another exemplary embodiment of the present disclosure.

For example, when the first program is a game program, the trial event includes a first trial event, and the first trial event includes: at least one of a game role killed, a specified mission completed, game pause, a request to obtain a specified prop, a game role winning, a request to enter a specified mission, a quantity of specified props being zero, a request to unlock specified game content, a specified achievement completed, a specified role killed, a specified game task taken, and opening an advertisement page. For example, FIG. 5 is a game interface 301 of a puzzle-type escape game. When a game role is died, a revival pop-up window 302 is displayed, and two game role revival manners are provided in the revival pop-up window, one of which is: tap a first control 303 and spend diamonds (game coins) to revive a virtual role; and the other of which is: tap a second control 304, and try the second program to revive the virtual role free of charge. For example, when the user taps the second control 304, that is, triggers a trial event, the first program (the puzzle-type escape game) transmits an invoke instruction to the trial SDK to start the trial SDK.

Figure 6:
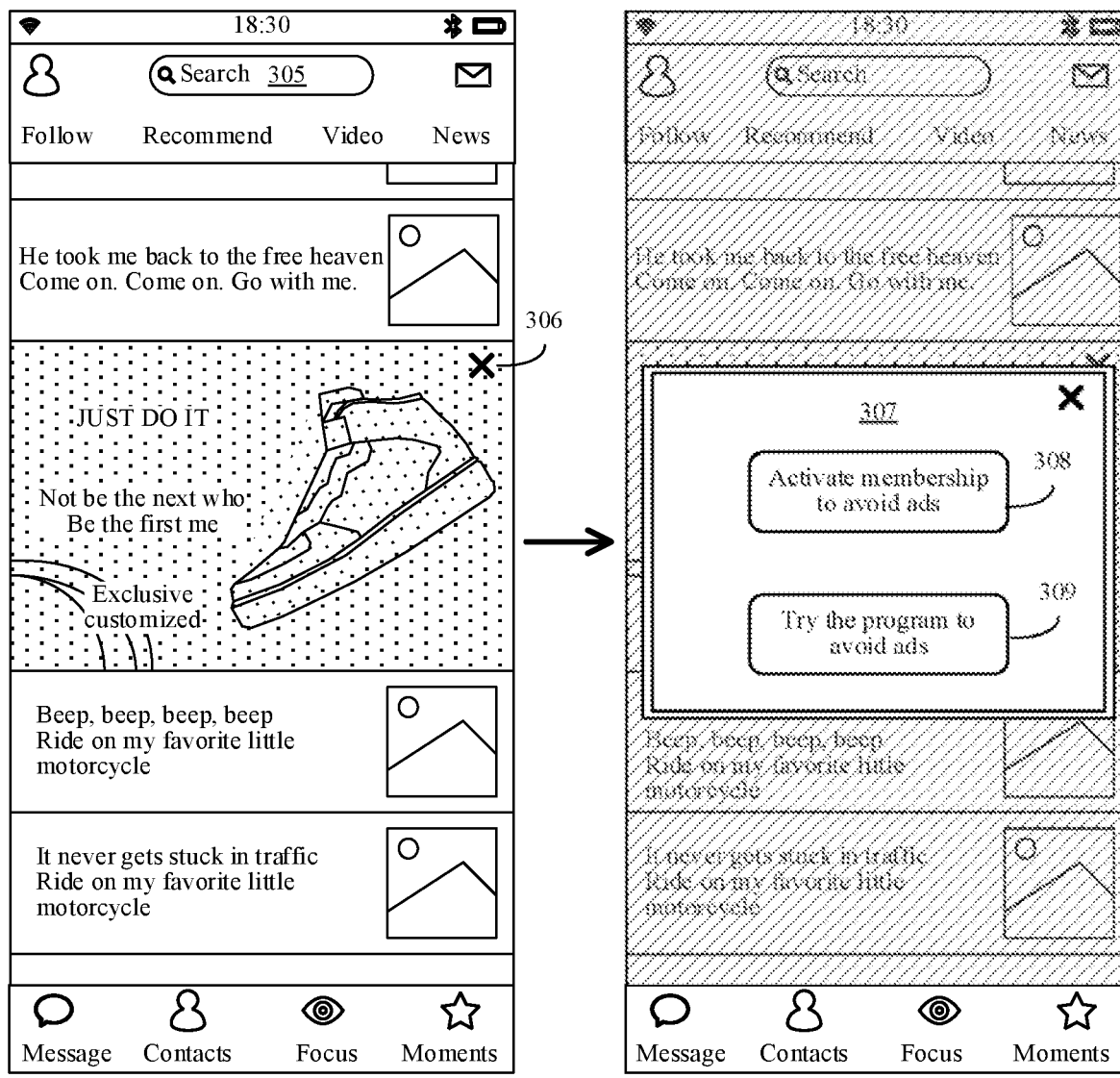
FIG. 6 is a schematic diagram of a user interface of a program trial method according to another exemplary embodiment of the present disclosure.

For another example, when the first program is a content browsing program, for example, a news program, an information program, a read program, a social program, a forum program, and a search engine program, the trial event includes a second trial event, and the second trial event includes: at least one of browsing specified content, browsing duration reaching specified duration, a request to unlock a specified function, a request to browse specified content, and a request to shield an advertisement. For example, FIG. 6 is an information page 305 of a search engine program. When the user taps a third control 306 to close an advertisement on the page, an advertisement shielding page 307 pops up, and the advertisement shielding page provides two manners of shielding the advertisement. One manner is: a fourth control 308 is triggered, and a member of the search engine program is enabled to remove the advertisement from the page. The other manner is: a fifth control 309 is triggered, and the second program is tried to remove the advertisement from the page. For example, when the user taps the fifth control 309, that is, triggers a trial event, the first program (the search engine program) transmits an invoke instruction to the trial SDK to start the trial SDK.

Figure 7:
FIG. 7 is a schematic diagram of a user interface of a program trial method according to another exemplary embodiment of the present disclosure.

For another example, when the first program is a video playback program, the trial event includes a third trial event, and the third trial event includes: at least one of play duration reaching specified duration, playing a specified video, a request to shorten advertisement time, and a request to play a specified video. For example, FIG. 7 is a video playback interface 310 of a video playback program, and a current video is a video that can be viewed only by using the second program. When the user taps a playback control 311, that is, triggers a trial event, the first program (the video playback program) transmits an invoke instruction to the trial SDK to start the trial SDK.

Step 202: The trial SDK transmits a trial request to the cloud server.

For example, the trial SDK transmits a trial request to the cloud server in response to receiving the invoke instruction transmitted by the first program in the running process, where the trial request is used for requesting to try the second program.

For example, the trial request is generated according to an invoke request, and data in the trial request includes at least one of data in the invoke request. For example, the data in the trial request includes: at least one of a program identifier of the first program, a current running scenario of the first program, an advertisement identifier, an advertisement type, and a program identifier of the second program.

In one embodiment, a data packet transmitted by the terminal to the cloud server includes a process identifier, and it may be determined, according to the process identifier in the data packet, that the data packet is transmitted to the cloud server by using a process in which the trial SDK is located.

Step 203: The cloud server receives the trial request, and runs a specified program logic of the second program to obtain a first trial image frame sequence. The second program may refer to the cloud application such as a cloud game. For example, a first output of the cloud application loaded with the trial setting can be obtained. The first trial image frame sequence may be obtained according to the first output. In some embodiments, the trial setting may correspond to the trial event.

For example, the cloud server stores trial information, and the cloud server determines, according to data carried in the trial request, a program that needs to be tried and a specified program logic of the program, so as to run the program to obtain a trial image frame. The program needs to be tried can be an application corresponding to the cloud application loaded with the trial setting.

For example, the program trial method provided in this embodiment may enable the user to try specified content in the second program, such as, to load the cloud application with the trial setting. The trial setting of the cloud application may include the specified program logic of the program. In some embodiments, the trial setting may include a specified game progress, a specified game scene of the cloud game corresponding to the trial event, and/or a specified function of the cloud application being enabled. The specified program logic includes at least one of a program of a specified progress, a program of a specified function, and a program of a specified scenario. For example, when a target of the second program is to complete an event, the event has completion progress, and the user may perform the event starting from specified progress. For example, when the second program is a game program, the specified progress may be specified game progress. The game progress is game content play progress, just as reading a novel, when a game is entered, the progress is 0%, and when a game mission is completed, it indicates that game experience progress reaches 100%. Game progress usually has multiple threads and multiple branches. For example, a character level is a thread, and when the level reaches the highest level, the game progress of this level is 100%. There are various character weapons and equipment. When all equipment is collected, the progress of equipment collection is 100%.

Therefore, the game progress may be an intuitive perception result determined according to comprehensive factors such as game time and operation progress. For example, the second program may be a mission game, and the mission game provides a plurality of game missions. Running the specified program logic of the second program by the cloud server may be: the cloud server runs the third mission of the mission game, so that the user can try the third mission of the mission game. For another example, when the second program is picture processing software, the specified progress may be specified task progress. For example, that the second program processes a picture includes three steps: cutting, beautifying, and filtering. Beautifying may be used as the specified task progress, so that the user skips the cutting step in the first step, and directly try beautifying.

In addition, a function of the second program may be specified, so that the user can try the function. For example, the second program is a document editing program, and provides a Word editing function, an Excel editing function, and a PowerPoint editing function. That the cloud server runs the specified program logic of the second program may be: the cloud server runs the Excel editing function of the document editing program, opens a trial Excel document, and enables the user to try the Excel editing function.

Alternatively, when the second program is a game program, some game programs divide games into different game scenarios, game modes, or game maps, and may also let the user enter a specified game scenario, game mode, or game map to try the second program. That is, the specified scenario includes at least one of a specified game scenario and a specified game mode. For example, the second program may be a role-playing game (RPG). In the RPG, the user may control a game role to enter different game scenarios. For example, the game scenarios include: an imi plateau, an ice-sealed forest, a mist swamp, and the like. A virtual role can enter different game scenarios to experience different game content. For example, the game role may kill a wild monster in some game scenarios, the game role may collect materials in some game scenarios, and the game role may trade commodities in some game scenarios. Running the specified program logic of the second program by the cloud server may be: the cloud server runs the RPG, controls a game role to enter a mist swamp scenario, and allows the user to control the game role to move in the mist swamp scenario. For another example, the second program may be a shooting game, and different game modes are provided in the shooting game. For example, the game modes include: a classic mode, a war mode, a sniper mode, and an entertainment mode. Different game modes have different game playing methods. Running the specified program logic of the second program by the cloud server may be: the cloud server runs the shooting game, controls the game role to enter the game in the classic mode, and allows the user to try the shooting game in the classic mode.

For example, the specified program logic is determined according to a preset mapping relationship, and the mapping relationship may be stored: a mapping relationship among the first program, a running scenario of the first program, the second program, and the specified program logic of the second program. The second program and the specified program logic are determined based on the first program and the running scenario of the first program when the trial event is triggered.

That is, the triggered specified program logic is different according to a different scenario in which the trial event is triggered. For example, for an advertisement control on the first program, the advertisement control may be triggered in different scenarios to try different specified program logics or different advertisement programs. When the first program runs in a first scenario, the user may trigger the advertisement control to try a first specified program logic of the second program. When the first program runs in a second scenario, the user may trigger the advertisement control to try a second specified program logic of the second program. This method is different from a method in a related art in which a fixed advertisement is played by triggering a fixed control, so that an advertisement and a running status of a host program can be closely combined. Based on different running statuses of the host program, different advertisements are pushed for the user, thereby enriching push manners of the advertisement.

The first trial image frame sequence includes at least one trial image frame. The trial image frame is a display picture of the second program that is obtained in real time by the cloud server in a process of running the second program. The cloud server sequentially captures a picture at the time of running the second program to obtain a trial image frame sequence, and then the trial SDK sequentially plays the trial image frame sequence to obtain a video running on the second program. For example, each trial image frame has a time stamp, and the cloud server transmits the trial image frame sequence to the trial SDK in sequence according to the time stamp of the trial image frame.

Step 204: The cloud server transmits the first trial image frame sequence to the trial SDK. In one example, the cloud server may encode the first output of the cloud application loaded with the trial setting and transmit the encoded data to the terminal. In another example, the cloud server may directly transmit the first output of the cloud application loaded with the trial setting to the terminal.

For example, after generating the trial image frame, the cloud server transmits the trial image frame to the trial SDK in real time to form a video stream.

For example, the cloud server performs video coding on the first trial image frame sequence to obtain video data, and transmits the video data to the trial SDK. The first trial image frame sequence can be obtained by performing video decoding on the video data by the trial SDK. For example, a manner in which the cloud server performs video coding may be compressing the trial image frame sequence into an H.264 format.

Step 205: The trial SDK receives the first trial image frame sequence, and superimposes and displays trial image frames of the first trial image frame sequence on a user interface of the first program. In other words, a first image frame of the cloud application is displayed on the user interface of the host program in response to the trial event being triggered, the first image frame being obtained based on the first output of the cloud application loaded with the trial setting. In some embodiments, the terminal decodes encoded data from the cloud server to obtain decoded image frame(s) as the first trial image frame sequence. In some embodiments, the terminal decodes encoded data from the cloud server to obtain decoded image frame(s), and adjusts one or more parameters of the decoded image frame(s) to obtain the first trial image frame sequence. Adjusting the decoded image frame may include, for example, adding a mask layer, adjusting a transparency, etc.

Figure 8:
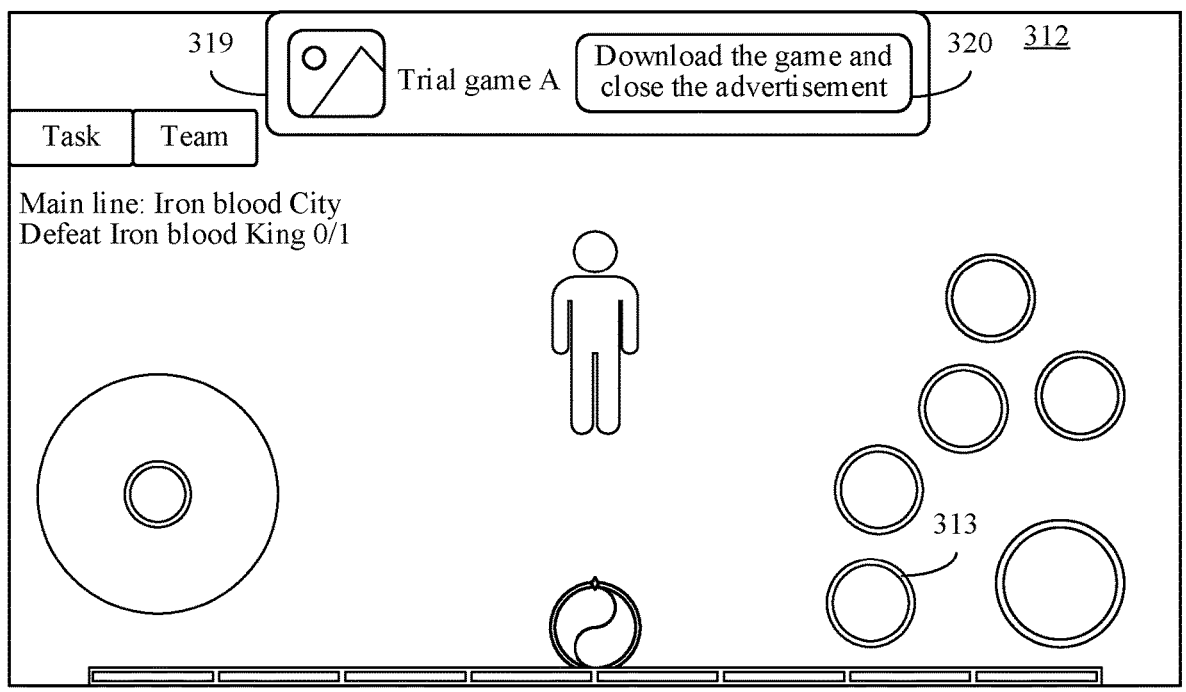
FIG. 8 is a schematic diagram of a user interface of a program trial method according to another exemplary embodiment of the present disclosure.

After receiving the first trial image frame sequence, the trial SDK renders the first trial image frame sequence to a display screen of the terminal for display. For example, superposition and displaying refers to: a display priority of the trial SDK is higher than a display priority of the first program, and the trial image frame of the trial SDK is displayed on an upper layer of the user interface of the first program. For example, the trial image frame of the trial SDK may cover the entire user interface of the first program, or may cover a part of the user interface of the first program. For example, transparency of the trial image frame may be adjusted, so that the user can see the user interface of the first program through the trial image frame. For example, FIG. 5 is a user interface of the first program. After the user taps the second control 304, as shown in FIG. 8, a trial image frame 312 of the second program is displayed, and the trial image frame 132 is displayed on an upper layer of the user interface of the first program, and covers the entire user interface of the first program.

Step 206: The trial SDK receives an operation event performed on the user interface (e.g., on a first image frame, on a second image frame, etc.).

For example, because the second program runs on the cloud server, the trial SDK needs to record a trigger operation of the user on the terminal, and transmit the trigger operation to the cloud server, so that the cloud server controls the second program to run according to the trigger operation.

For example, the operation event is used for determining a trigger operation of the user on the trial image frame. The operation event is generated according to the trigger operation of the user. For example, the trial SDK records an operation of the user on the trial image frame to generate an operation event. A manner of recording an operation event by the trial SDK may be as follows: Position information of a touch point generated when the user touches the display screen is periodically recorded, for example, the position information of the touch point is recorded every 0.01 s, and an operation event is generated. For example, the trial SDK may establish a rectangular coordinate system by using directions parallel to bezels of the display screen as x and y axes and any point on the display screen as an origin, to record position coordinates of a touch point on the rectangular coordinate system.

For example, the trial SDK may also identify the trigger operation of the user. When the trigger operation of the user is a valid operation, the valid operation is uploaded to the cloud server as an operation event. For example, the trial SDK may identify an effective operation such as a tap operation, a double-tap operation, a slide operation, and a drag operation according to a motion track of a touch point within a period of time.

For example, as shown in FIG. 8, when the user taps a skill control 313 on the trial image frame, the trial SDK generates an operation event and transmits the operation event to the cloud server according to a tap operation record of the user and tap position coordinates of the user.

Step 207: The trial SDK transmits the operation event to the cloud server.

Step 208: The cloud server receives the operation event, and controls the second program to respond to the operation event to obtain a second output of the cloud application loaded with the trial setting, such as a second trial image frame sequence (i.e., a sequence of second image frames).

After receiving the operation event, the cloud server generates a corresponding control instruction according to the operation event, and controls the second program to respond to the user operation according to the control instruction. For example, the second program responds to the operation event and a picture of the second program changes to obtain the second trial image frame sequence.

The second trial image frame sequence includes at least one trial image frame sequence. A time stamp corresponding to the second trial image frame sequence is later than that of the first trial image frame sequence.

For example, as shown in FIG. 8, after receiving the operation event of taping the skill control 313 by the user, the cloud server controls the second program to respond to the operation event, and the second program controls a virtual role to use the skill according to the operation event to generate a picture of the virtual role using the skill to obtain the second trial image frame sequence.

Step 209: The cloud server transmits the second trial image frame sequence to the trial SDK. In one example, the cloud server may encode the second output of the cloud application loaded with the trial setting and transmit the encoded data to the terminal. In another example, the cloud server may directly transmit the second output of the cloud application loaded with the trial setting to the terminal.

Step 210: The trial SDK receives the second trial image frame sequence, and superimposes and displays trial image frames of the second trial image frame sequence (e.g., a second image frame) on the user interface of the first program. In some embodiments, the terminal decodes encoded data from the cloud server to obtain decoded image frame(s) as the second trial image frame sequence. In some embodiments, the terminal decodes encoded data from the cloud server to obtain decoded image frame(s), and adjusts one or more parameters of the decoded image frame(s) to obtain the second trial image frame sequence. Adjusting the decoded image frame may include, for example, adding a mask layer, adjusting a transparency, etc. In some embodiments, the second image frame is the second output of the cloud application combined with a mask layer.

In some embodiments, the trial SDK may receive another operation event performed on the user interface when displaying the second image frames. In some embodiments, steps 206 through 210 may be repeated to respond to the another operation event. In some embodiments, the terminal may stop displaying the second image frames in response to a stop condition being met.

For example, the cloud server transmits the generated trial image frame to the trial SDK in real time, and the trial SDK displays the trial image frame in real time, so as to display, in real time, the picture of the second program running in the cloud server on the terminal.

For example, the first program is logged in with a first user account (for example, the first user account may be a first mobile number), and a trial request transmitted by the trial SDK to the cloud server includes the first user account. In a trial process of the second program, or after the trial of the second program ends, the cloud server may transmit trial data to a second server corresponding to the second program. The second server stores the trial data and a second user account correspondingly, and the second user account has an association relationship with the first user account, for example, they correspond to the same mobile number (the first mobile number). When the user logs in to the second program with the second user account, the second server may synchronize the trial data to the terminal, so that the second user account continues to use the second program starting from progress stored in the trial data.

That is, the server (the second server) corresponding to the trial program (the second program) may store the progress of the user in the trial process. The executing logic of the trial program may be the same as at least part of the executing logic of the target program to be promoted. After the user tries the second program, the second program is downloaded and run. After the second program is logged in with the second user account, the second server may synchronize the progress to the second program (terminal), so that the user continues to use the second program immediately following the previous trial progress.

That is, the cloud server transmits trial data to the second server, where the trial data includes the first user account and data generated by running the specified program logic of the second program. The terminal runs the second program, and acquires trial data in response to the second user account corresponding to the first user account logged in to the second program. The terminal runs the second program based on the trial data, and displays a user interface of the second program.

In conclusion, according to the method provided in this embodiment, a specified program logic of a program is displayed to a user in a program trial manner, so that the user tries a function, progress, or scenario of the program, so that the user can intuitively understand the program by trying the program. In this method, based on a cloud technology, a specified program logic of a trial program is run in a cloud server, and the cloud server generates a trial image frame according to a running result, and transmits the trial image frame to a terminal. A trial SDK on the terminal decodes and displays the trial image frame, so that a picture of the trial program can be displayed on the terminal without installing the trial program. When the terminal receives an operation of the user on the trial picture, the SDK uploads the operation to the cloud server, and the cloud server controls the second program to generate a new trial image frame in response to the user operation, so that the user can control the second program and try the second program. Compared with an existing video advertisement, the method does not need to produce a promotional video frame by frame, but instead generates and displays a picture by running a trial program in real time. During production of a promotional file, only a related interface needs to be invoked to run the trial program on the cloud server, thereby reducing costs required for the terminal to try the program and improving trial efficiency.

For example, a plurality of programs may be tried by using the trial SDK, and the cloud server determines the program for the current trial according to the trial request.

Figure 9:
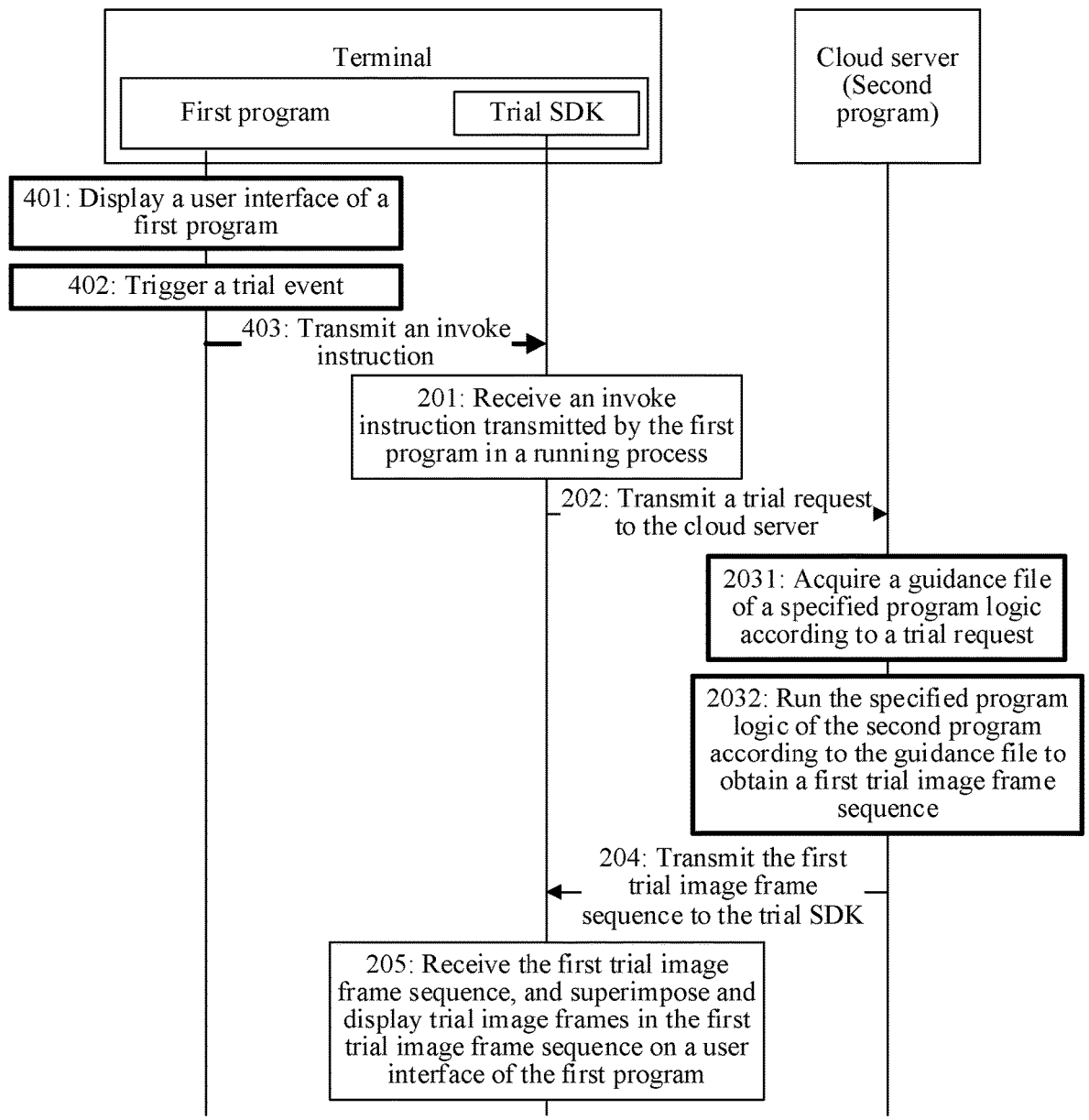
FIG. 9 is a flowchart of a program trial method according to another exemplary embodiment of the present disclosure.

FIG. 9 is a flowchart of a program trial method according to another exemplary embodiment of the present disclosure. The method may be performed by the computer system shown in FIG. 1, FIG. 2, or FIG. 3. The computer system includes: a terminal and a cloud server, where a first program and a trial SDK are running on the terminal. Based on the exemplary embodiment shown in FIG. 4, before step 201, the method further includes step 401 to step 403, and step 203 further includes step 2031 and step 2032.

Step 401: The terminal displays a user interface of a first program.

Step 402: The terminal triggers a trial event.

For example, the terminal triggers the trial event on the user interface of the first program, that is, the terminal triggers the trial event in the first program.

When the first program is a game program, and an invoke instruction is transmitted by the first program in response to triggering a first trial event, the first trial event includes: at least one of a game role killed, a specified mission completed, game pause, a request to obtain a specified prop, a game role winning, a request to enter a specified mission, a quantity of specified props being zero, and a request to unlock specified game content.

When the first program is a content browsing program, and the invoke instruction is transmitted by the first program in response to triggering a second trial event, the second trial event includes: at least one of browsing specified content, browsing duration reaching specified duration, a request to unlock a specified function, and a request to browse specified content; or When the first program is a video playback program, and the invoke instruction is transmitted by the first program in response to triggering a third trial event, the third trial event includes: at least one of play duration reaching specified duration, playing a specified video, a request to shorten advertisement time, and a request to play a specified video.

Step 403: The first program transmits an invoke instruction to a trial SDK.

For example, data in the invoke instruction is used for being transmitted to the cloud server by using the trial SDK, so that the cloud server determines, according to the data, a program tried current time and a specified program logic.

Step 2031: The cloud server acquires a guidance file of a specified program logic according to a trial request.

For example, the cloud server runs the specified program logic of the second program in a manner of replacing the guidance file. The guidance file is used for storing running progress of the second program, or is used for specifying a function of running the second program.

An example in which the guidance file is used for storing the running progress of the second program is used. When the second program is a locally archived program, the guidance file includes an archive file. When the second program is a network archived program, the guidance file includes a configuration file.

For example, when the second program is a network archived program, the cloud server runs the specified program logic by replacing the configuration file of the program. For example, the configuration file of the second program is located in "Android\data\ . . . \Saved\Paks" folder. When the specified program logic of the second program is configured, a configuration file of a specified program logic can be generated according to specific content/environment/playing method of the second program. For example, the cloud server stores the generated configuration file to a specified position. When the cloud server needs to run the specified program logic, the cloud server obtains the configuration file, adds the configuration file to "Android\data\ . . . \Saved\Paks" folder, and then starts the second program to activate the program logic corresponding to the configuration file. For example, the cloud server may directly invoke an API interface provided by a server of the second program to directly activate the specified program logic to enter corresponding progress, function, or scenario.

For example, when the second program is a locally archived program, the cloud server runs the specified program logic in a manner of replacing the archive file. For example, the archive file of the second program is located in "\data\data\peg-name\" folder. When the specified program logic of the second program is configured, the archive file of the specified program logic is configured, and the archive file is stored. When the specified program logic needs to be run, the cloud server acquires the archive file, stores it in "\data\data\peg-name\" folder to replace the original local archive file, and then runs the second program to run the specified program logic.

For example, the cloud server correspondingly stores related information of the second program, and the cloud server correspondingly searches for the program of this trial and the specified program logic according to data in the trial request.

For example, the invoke instruction includes a program identifier of the first program, and the trial request includes a program identifier. The cloud server is further configured to determine the second program and the specified program logic according to the program identifier in the trial request; acquire the guidance file according to a storage path of the guidance file of the specified program logic; and obtain a first trial image frame sequence by running the specified program logic of the second program according to running information of the second program and the guidance file.

For example, the cloud server stores trial program release information, and records a correspondence among a host program (the first program), the trial program (the second program), and the specified program logic. Different host programs correspond to different trial programs. When invoking the trial SDK, the first program transmits the program identifier of the first program to the trial SDK, and then the trial request transmitted by the trial SDK to the cloud server also carries the program identifier. After receiving the trial request, the cloud server determines, according to the program identifier of the first program, the trial program corresponding to the first program: the second program; and also determines the specified program logic of the second program, and then determines the storage path of the guidance file corresponding to the specified program logic, so as to obtain the guidance file, and stores the guidance file in a specified folder. Then the cloud server runs the second program to run the specified program logic of the second program.

For another example, the invoke instruction further includes channel scenario information of a trial scenario of the first program, and the trial request further includes the channel scenario information. The cloud server is further configured to determine the second program and the specified program logic according to the program identifier and the channel scenario information that are in the trial request.

For example, the cloud server further stores the channel scenario information of the host program, initiates trial from different channel scenarios of the host program, and tries to use different trial programs, or tries to use different program logics of the same trial program. For example, the first program is a mission game, and a user may revive a game role by using the second program after the game role is killed. The first mission corresponds to one piece of channel scenario information (a first channel scenario identifier), and the second mission corresponds to one piece of channel scenario information (a second channel scenario identifier). An invoke instruction transmitted by the game role when being killed in the first mission includes the first channel scenario identifier, the trial request includes the first channel scenario identifier, the cloud server determines, according to the first channel scenario identifier, a corresponding trial program and a specified program logic of the second mission of the first program, and finds a corresponding guidance file, and replaces the guidance file.

For another example, the invoke instruction further includes user information stored in the first program, and the trial request further includes the user information. The cloud server is further configured to determine the second program and the specified program logic according to the program identifier and the user information in the trial request.

For example, one host program may be corresponding to a plurality of trial programs. When the first program invokes the trial SDK, the invoke instruction includes user information. The trial SDK transmits the user information to the cloud server by using the trial request. The cloud server may select, according to the user information, one of the plurality of trial programs corresponding to the first program as the trial program, or select, according to the user information, one of a plurality of program logics of the trial program, as the specified program logic of the current trial program. For example, the user information may include gender information. When the user gender is male, a shooting game or a sports event program may be selected from a plurality of trial programs as a trial program of current trial. When the gender of the user is female, a shopping program may be selected from a plurality of trial programs as a trial program for current trial, or a clothes changing card of a puzzle-type game is used as a specified program logic for the current trial. For example, the user information is user information stored in the first program, for example, user information of a user account logged in to the first program. When the user information is not logged in to the first program, a history record of the user on the first program may also be used as the user information, for example, a web page browsed by the user is used as the user information. For example, the user information may include: at least one of a user name, a user identifier, a gender, a registration time, a history record, a profile photo, an age, an interest, or a friend list. For example, the cloud server may generate a user picture according to the user information, and select, according to the user picture, the trial program to be tried current time from the plurality of trial programs, or select the specified program logic to be tried current time from the plurality of program logic. For example, the cloud server may further store the user information. When the trial request of the user is received again, a case of historical trial of the user is used as reference to recommend a trial program to the user.

For another example, the invoke instruction further includes an interface screenshot of the first program, and the trial request further includes the interface screenshot. The cloud server is further configured to identify the interface screenshot to obtain an identification result; and determine the second program and the specified program logic according to the identification result and the program identifier in the trial request.

For example, the first program may further obtain the interface screenshot by using the user interface screenshot, and transmit the interface screenshot to the trial SDK, and the trial SDK transmits the interface screenshot to the cloud server by using the trial request. The cloud server performs image identification on the interface screenshot to obtain an identification result, and determines a trial program and a specified program logic of this trial according to the identification result. For example, when the cloud server identifies that the interface screenshot includes the word "win", the second program is used as the trial program, and when the cloud server identifies that the interface screenshot includes the word "lose", a third program is used as the trial program. For example, the cloud server may also compare the interface screenshot with a sample screenshot. If the interface screenshot is the same as the sample screenshot in more than 80% of pixels, a trial program or program logic corresponding to the sample screenshot is used as the trial program and specified program logic for this trial. That is, the cloud server may pre-store several sample screenshots of the first program. Each sample screenshot corresponds to one trial program and specified program logic, and uses the sample screenshot to identify a currently running scenario of the first program, so as to determine the trial program and the specified program logic.

Step 2032: The cloud server runs the specified program logic of the second program according to the guidance file to obtain a first trial image frame sequence.

For example, the cloud server stores the guidance file in a specified position, and then runs the second program, to run the specified program logic of the second program.

Figure 10:
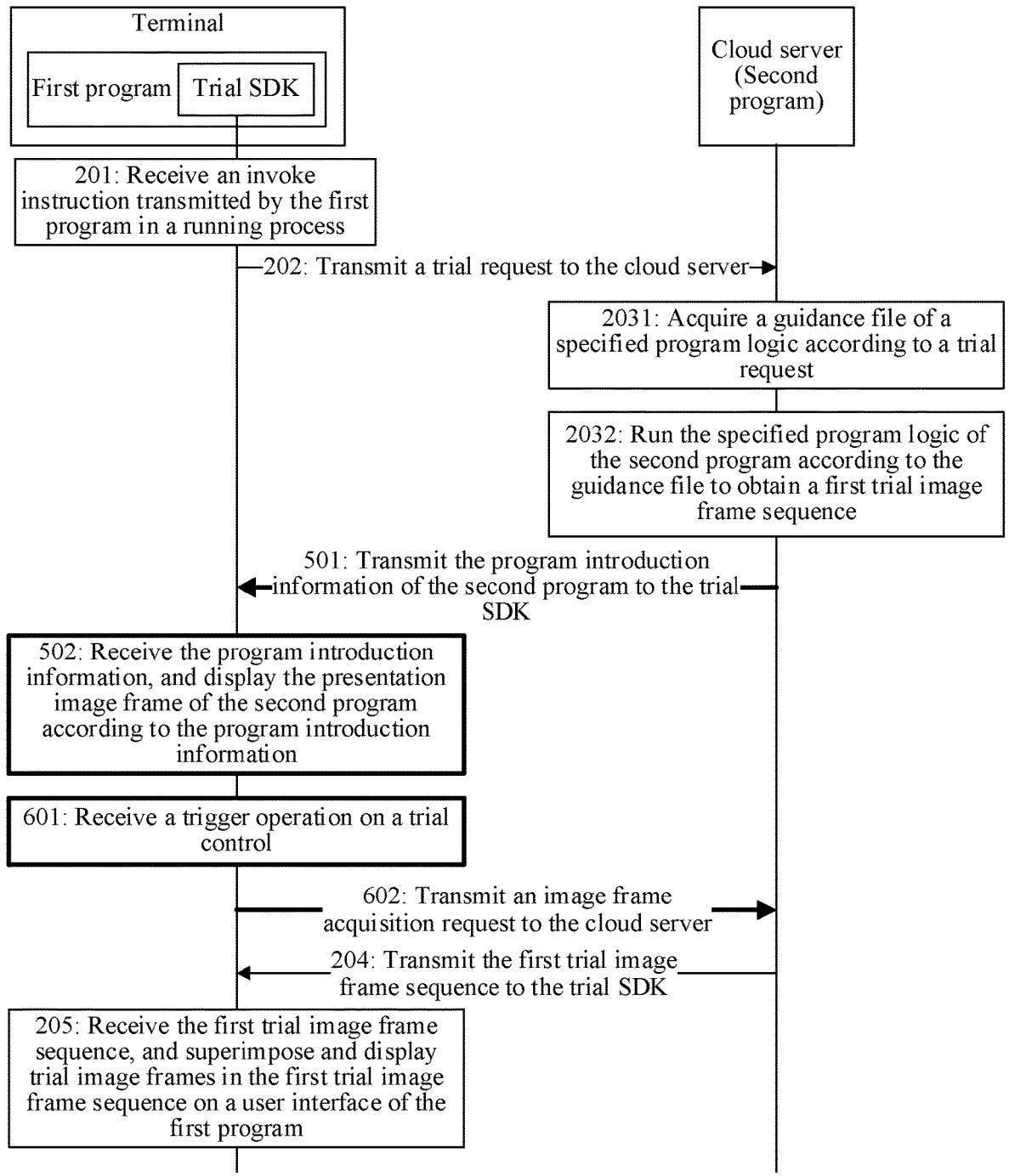
FIG. 10 is a flowchart of a program trial method according to another exemplary embodiment of the present disclosure.

For example, after the trial SDK transmits the trial request to the cloud server, the cloud server returns program introduction information of the second program to the trial SDK, so that the trial SDK displays a presentation image frame of the second program. As shown in FIG. 10, the method further includes step 501 and step 502, step 601 and step 602.

Step 501: The cloud server transmits the program introduction information of the second program to the trial SDK.

The program introduction information is used for displaying the presentation image frame of the second program. For example, the program introduction information includes at least one of an icon, a name, an introduction, a picture, or a promotional text of the second program that may be displayed on the presentation image frame. For example, the program introduction information may further carry other information, for example, at least one of a program identifier (a program identifier of the second program) of the trial program for this trial, an advertisement type, and trial duration.

For example, a sequence of step 501 and step 203 is not limited in this embodiment. Step 501 to step 602 may be performed before step 203, or may be performed after step 203. For example, step 203 and step 501 to step 602 are steps that are performed synchronously. For example, step 501, step 502, step 601, and step 602 are performed before step 204 and after step 202. For example, only step 501 and step 502 may be performed, or all of step 501, step 502, step 601, and step 602 may be performed.

Step 502: The trial SDK receives the program introduction information, and displays the presentation image frame of the second program according to the program introduction information.

the trial SDK superimposes and displays the presentation image frame of the second program on the user interface of the first program according to the program introduction information in response to receiving the program introduction information of the second program transmitted by the cloud server.

Figure 11:
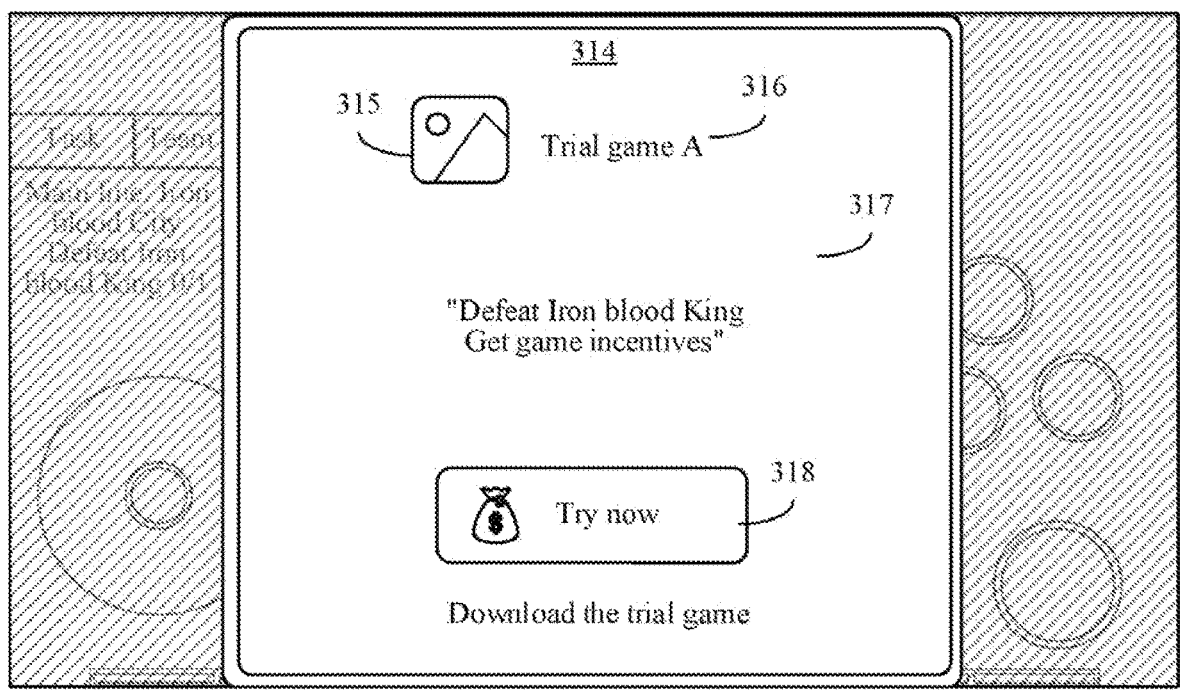
FIG. 11 is a schematic diagram of a user interface of a program trial method according to another exemplary embodiment of the present disclosure.

For example, the trial SDK superimposes and displays the presentation image frame of the second program on the user interface of the first program. For example, the presentation image frame is an introduction image of the second program, and is used for describing the second program. For example, the presentation image frame is a page displayed to the user before the user starts to actually try the second program, and the page does not belong to a picture corresponding to the specified program logic of the second program. Information of the second program, such as an icon, a name, a promotional text, a function, a playing method, an operation presentation, and the like, is generally displayed on the presentation image frame. In the presentation image frame, a trial control is disposed on the presentation image frame. When the terminal receives a trigger operation on the trial control, the second program is started to be tried. The terminal transmits a trial image frame acquisition request to the cloud server, and starts to receive a trial image frame sequence transmitted by the cloud server. In another presentation image frame, a trial control is not disposed on the presentation image frame, and a trigger area that can interact with the user is not disposed on the presentation image frame. The user can only watch a demonstration image frame. In this period, when the terminal receives the trial image frame sequence transmitted by the cloud server, the terminal starts to display the trial image frame sequence, and starts to try the second program. For example, the presentation image frame is a frame picture, and does not have continuous front and rear frame pictures (there may be a simple animation or a short video on the presentation image frame, and front and rear frames of the simple animation or the short video are not considered). The trial image frame is a trial picture. The trial image frame sequence may form a trial video, and have continuous front and rear frame pictures. For example, as shown in FIG. 11, the presentation image frame of the second program is provided, and an icon 315 of the second program, a name 316 of the second program, and a promotional text 317 of the second program are displayed on the presentation image frame 314.

For example, the program introduction information is stored in the cloud server in advance. After receiving the trial request, the cloud server may immediately return the program introduction information of the second program to the trial SDK, and the second program does not need to be run. That is, before running the second program, the cloud server may return the program introduction information of the second program to the trial SDK.

Step 601: The trial SDK receives a trigger operation on a trial control.

For example, the trial control is displayed on the presentation image frame. The trial control is configured to transmit an image frame acquisition request to the cloud server, so that the cloud server transmits a trial image frame of the second program.

In response to receiving a trigger operation on the trial control, the trial SDK transmits a video acquisition request to the cloud server, where the video acquisition request is used for requesting to acquire the first trial image frame sequence.

For example, as shown in FIG. 11, a trial control 318 is displayed on the presentation image frame, and when the user taps on the trial control 318, the trial SDK receives a trigger operation (tap operation) on the trial control 318.

Step 602: The trial SDK transmits an image frame acquisition request to the cloud server.

For example, after receiving the image frame acquisition request transmitted by the trial SDK, the cloud server starts to transmit the trial image frame (the first trial image frame sequence) to the trial SDK. For example, the trial control may not be set on the presentation image frame, and the cloud server transmits the first trial image frame sequence to the trial SDK immediately after generating the first trial image frame sequence.

In conclusion, in the method provided in this embodiment, when the first program triggers the trial event, the invoke instruction is transmitted to the trial SDK, and the trial SDK transmits the trial request to the cloud server according to the invoke instruction. The first program may be set with a trigger condition of trial, and the trial SDK may be invoked to try another program in a plurality of trigger conditions, which is applicable to a plurality of application scenarios.

According to the method provided in this embodiment, the specified program logic of the second program is run according to the guidance file of the specified program logic, the guidance program logic may be replaced by replacing the guidance file, and progress/mission/content of program trial in an advertisement may be changed at any time by means of lightweight adjustment, thereby greatly reducing advertisement injecting trial and error costs.

According to the method provided in this embodiment, the cloud server determines a trial program and a specified program logic of this trial program according to data in a trial request, so that one host program may correspond to a plurality of different trial programs or a plurality of different program logics, which provides a possibility for the program to try a plurality of programs.

For example, in a process of running the second program, the cloud server further performs a specified operation when detecting a key frame by performing key frame detection on a trial image frame. For example, the cloud server may add a mask layer to the trial image frame to display a text, a picture, or a control. The user can download the second program by tapping a download control on the mask layer.

Figure 12:
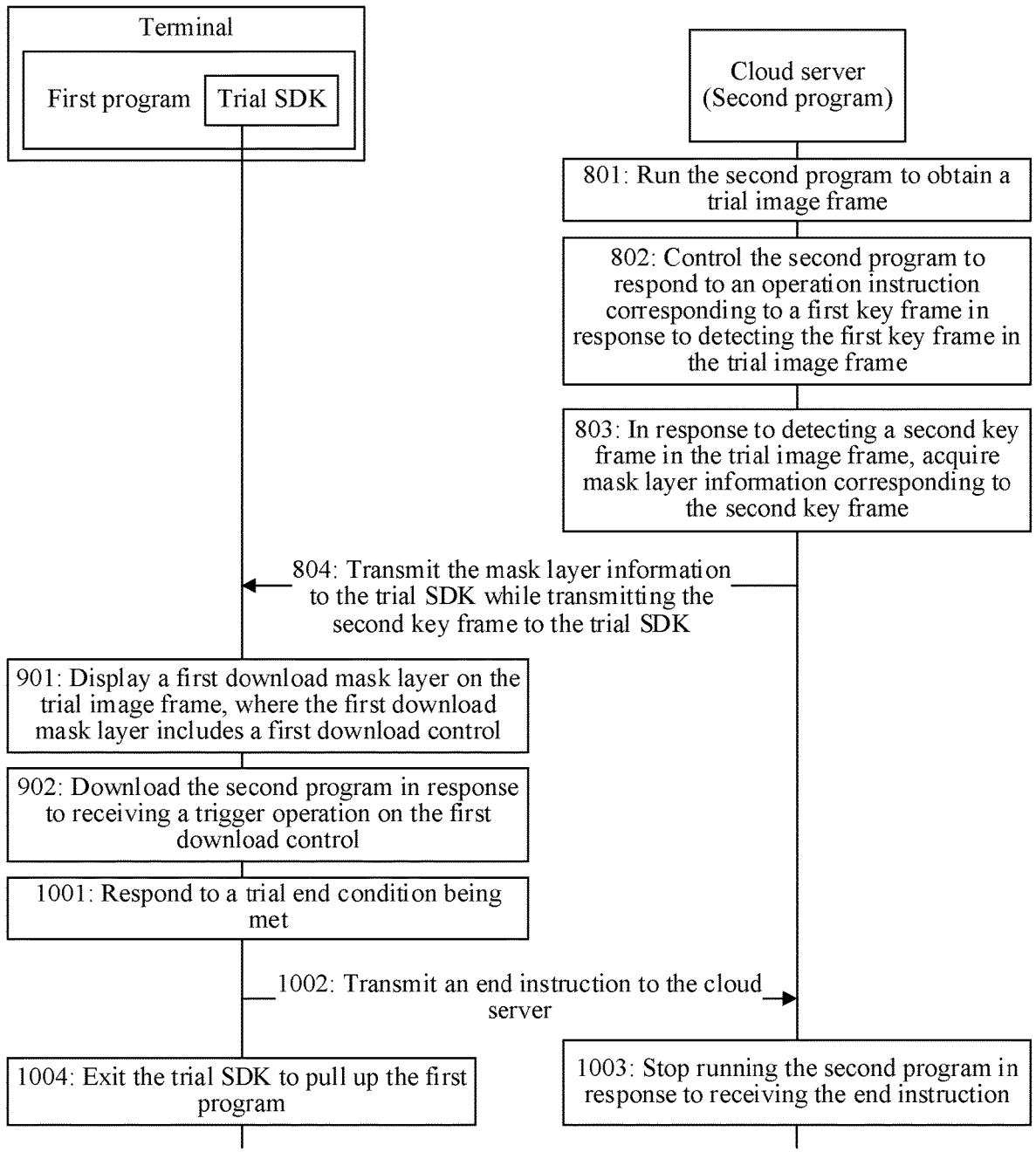
FIG. 12 is a flowchart of a program trial method according to another exemplary embodiment of the present disclosure.

FIG. 12 is a flowchart of a program trial method according to another exemplary embodiment of the present disclosure. The method may be performed by the computer system shown in FIG. 1, FIG. 2, or FIG. 3. The computer system includes: a terminal and a cloud server, where a first program and a trial SDK are running on the terminal. The method includes the following steps.

Step 801: The cloud server runs the second program to obtain the trial image frame.

For example, after receiving the trial request transmitted by the trial SDK, the cloud server runs the second program, and captures an interface screenshot of the second program to obtain the trial image frame.

Step 802: In response to detecting a first key frame in the trial image frame, the cloud server controls the second program to respond to an operation instruction corresponding to the first key frame, where the operation instruction is used for completing a specified operation in the second program, and the trial image frame is a trial image frame in the first trial image frame sequence or the second trial image frame sequence.

For example, at some moments at which the second program runs, the cloud server needs to automatically operate the second program to perform a corresponding operation, or the cloud server needs to perform processing on the trial image frame, so as to present a new picture to the user. Therefore, the cloud server detects the generated trial image frame, finds the key frame, and performs a corresponding operation according to the type of the key frame.

For example, the server may find the key frame by means of image identification. For example, the key frame is identified according to a specified character, pattern, and graphic information. When the trial image frame includes a specified character, pattern, graph, and color block, the trial image frame is the key frame. For example, the server may also identify the key frame by invoking an image identification model.

For example, the cloud server monitors the first key frame in the trial image frame, and when detecting the first key frame, controls the second program to complete a specified operation according to an operation instruction corresponding to the first key frame. For example, the first key frame is a trial image frame that includes a keyword "login". When detecting the first key frame, the cloud server automatically controls the second program to log in to a specified user account. For another example, the cloud server identifies, according to the key frame, the first trial image frame transmitted to the trial SDK, or determines an end moment of program trial, or invokes a specified interface, or invokes a specified function, or automatically performs a trigger operation, or automatically exits the program.

Step 803: The cloud server acquires, in response to detecting a second key frame in the trial image frame, mask layer information corresponding to the second key frame, where the mask layer information is used for controlling the trial SDK to display a customized mask layer on the second key frame.

For example, the cloud server may further overwrite the customized mask layer on the image of the key frame by detecting the key frame, and may display at least one of a picture, a text, or a UI control on the customized mask layer.

For example, content displayed on the mask layer may be customized. For example, information on the mask layer may be set to instruct the user to download the text, the picture, and the download control of the second program. For example, an identification logic of the key frame and the mask layer information added to the key frame may be configured by using a management background.

For example, the customized mask layer is displayed on an upper layer of the trial key frame, that is, the customized mask layer is superimposed and displayed on the trial key frame.

For example, the mask layer information includes: at least one type of information of content (text, picture, UI control) displayed on the mask layer, a position of the mask layer displayed on the trial image frame, display duration of the mask layer, and a key frame corresponding to the mask layer.

Step 804: The cloud server transmits the mask layer information to the trial SDK while transmitting the second key frame to the trial SDK.

For example, after the second key frame is detected, when transmitting the second key frame, the cloud server packages and transmits the mask layer information corresponding to the second key frame to the trial SDK, so that the trial SDK displays the customized mask layer on the second key frame according to the mask layer information when displaying the second key frame.

For example, the terminal receives, by using the trial SDK, the second key frame and the mask layer information that are transmitted by the cloud server, the second key frame being corresponding to the mask layer information; and displays the customized mask layer on the second key frame according to the mask layer information in response to displaying the second key frame. The customized mask layer is a layer displayed on the trial image frame, and the customized mask layer locally shields the trial image frame, or shields the entire trial image frame. For example, the data packet transmitted by the cloud server to the trial SDK includes the second key frame and the mask layer information, where a time stamp is corresponding to the mask layer information, and the time stamp is the same as the time stamp of the second key frame. For example, the customized mask layer includes but is not limited to a first download mask layer and a second download mask layer that are provided in the following embodiments.

For example, as shown in FIG. 8, a customized mask layer 319 is displayed on the trial image frame (the second key frame), and an icon of the second program, a name of the second program, and a download control 320 of the second program are displayed on the customized mask layer 319.

Step 901: The trial SDK displays a first download mask layer on the trial image frame, where the first download mask layer includes a first download control.

In an embodiment, the first download mask layer is displayed on the trial image frame, the first download mask layer is a customized mask layer, the mask layer includes the first download control, and the first download control is used for downloading the second program.

Step 902: The trial SDK downloads the second program in response to receiving a trigger operation on the first download control.

For example, the trial SDK invokes, by using the trial SDK in response to receiving a trigger operation on the first download control, the first program to download the second program, or transmits a download request for downloading the second program to the cloud server, or invokes a third-party program to download the second program.

For example, when the terminal receives the trigger operation on the first download control, the trial SDK may be used for transmitting a request for downloading the second program to the cloud server, or the trial SDK may be used for invoking a download component of the first program to download the second program, or the trial SDK may be used for invoking a third-party program to download the second program. The third-party program is a program that can download the second program. For example, the third-party program may be an application store or a browser. For example, the terminal may also transmit the download request for downloading the second program to the cloud server by using the trial SDK, and then the cloud server forwards the download request to the server of the second program. The server of the second program provides the download data for the second program to the cloud server, and then the cloud server transmits the download data to the trial SDK.

For example, in one embodiment, when the user taps the download control to download the second program, this trial ends, and the terminal exits the trial SDK.

Step 1001: The trial SDK responds to a trial end condition being met. The trial end condition may also be referred as stop condition.

For example, the trial end condition provided in this embodiment includes at least one of the following conditions: 1. When a trial time reaches trial duration, the trial ends. 2. When the trial time reaches the trial duration, the second download mask layer is displayed. When the user taps download or exit, the trial ends. 3. When a key frame is detected, the trial ends. 4. When a key frame is detected, a third download mask layer is displayed. When the user taps download or exit, the trial ends.

For example, the trial SDK times the trial time of the second program; transmits an end instruction to the cloud server to end the trial process in response to the trial time reaching the trial duration; or times the trial time of the second program, and displays the second download mask layer in response to the trial time reaching the trial duration, where the second download mask layer includes the second download control and a first exit control; and in response to receiving a trigger operation on the second download control or the first exit control, transmits an end instruction to the cloud server to end the trial process.

Figure 13:
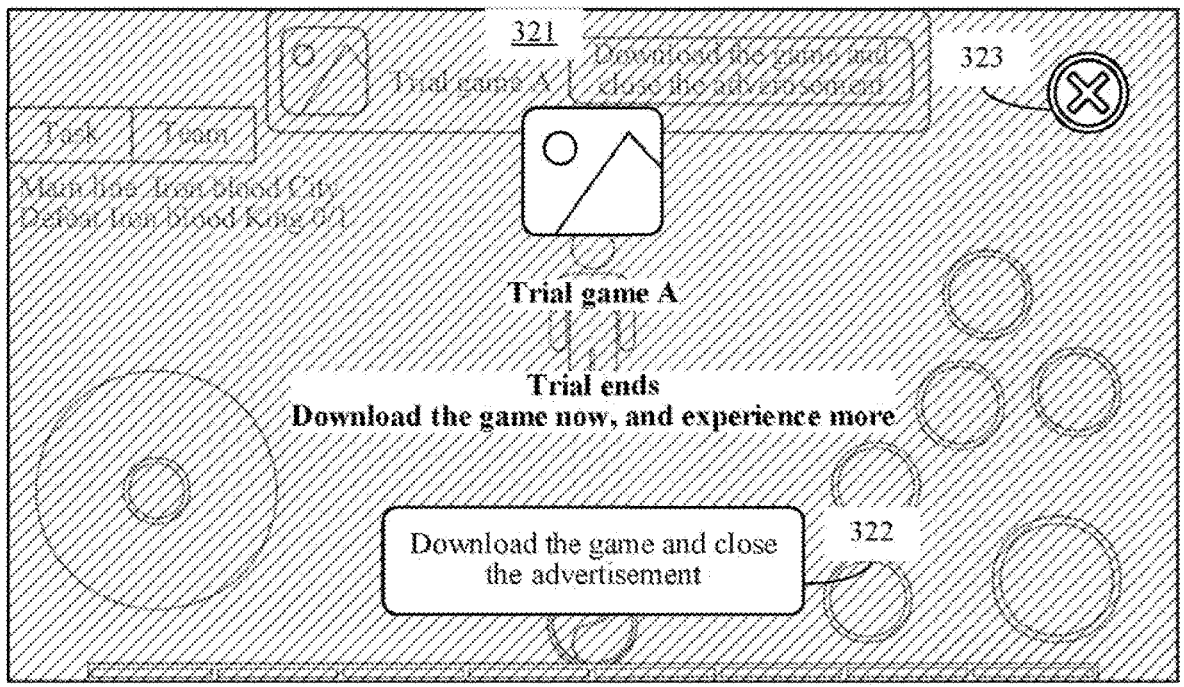
FIG. 13 is a schematic diagram of a user interface of a program trial method according to another exemplary embodiment of the present disclosure.

For example, the trial duration is 60 s, that is, after the user tries the second program for 60 s, the terminal automatically exits the trial, and the trial SDK transmits an end instruction to the cloud server, and stops the process of the trial SDK. For another example, after the user tries 60 s, the second download mask layer is displayed on the trial image frame, and the user may exit the trial by triggering the download control or exit control. For example, as shown in FIG. 13, a second download mask layer 321 is displayed on the trial image frame, and a download control 322 and an exit control 323 are on the second download mask layer 321. The user may download the second program by triggering the download control 322 and exit the trial, or may exit the trial by triggering the exit control 323.

For example, in response to displaying a third key frame, an end instruction is transmitted to the cloud server to end a trial process; or in response to displaying the third key frame, a third download mask layer corresponding to the third key frame is displayed, the third download mask layer including a third download control and a second exit control; and in response to receiving a trigger operation on the third download control or the second exit control, an end instruction is transmitted to the cloud server to end the trial process.

For example, when the cloud server detects the third key frame, when transmitting the third key frame to the trial SDK, the cloud server delivers an end instruction. When receiving the end instruction, the trial SDK stops the trial process at the third key frame.

The cloud server stops running the second program in response to receiving the end instruction.

For example, when the trial SDK stops the trial process, the trial SDK further transmits trial information to the first program. The trial information includes a time of the current trial, whether to download the second program, and the like. The first program may reward the user according to the trial information, for example, revive a game role, unlock a prop, and unlock a mission.

For example, the terminal times the trial time of the second program; ends a trial process in response to the trial time reaching trial duration; or times the trial time of the second program, and displays the second download mask layer in response to the trial time reaching the trial duration, where the second download mask layer includes the second download control and a first exit control; and ends the trial process in response to receiving a trigger operation on the second download control or the first exit control.

For example, the terminal may further end the trial process in response to displaying the third key frame; or displays, in response to displaying the third key frame, a third download mask layer corresponding to the third key frame, the third download mask layer including a third download control and a second exit control; and ends the trial process in response to receiving a trigger operation on the third download control or the second exit control.

Step 1002: The trial SDK transmits an end instruction to the cloud server.

Step 1003: The cloud server stops running the second program in response to receiving the end instruction.

Step 1004: The terminal exits the trial SDK to pull up the first program.

For example, after exiting the trial SDK, the terminal may automatically pull up the first program, so that the user automatically returns to the first program, and continues to browse the first program.

In conclusion, the method provided in this embodiment controls the second program to automatically perform some operations by detecting a key frame, so as to automatically perform some steps in the second program, for example, login to an account, so as to reduce a user operation and improve trial efficiency. By detecting the key frame, a mask layer is added to and displayed on the key frame, and promotional information is added and displayed on the mask layer, so as to quickly generate promotional information. By setting a download control on the mask layer, a quick download mode is provided to simplify an operation of downloading an trial program.

For example, the program trial system further includes a management background, and the management background is configured to manage data in the cloud server.

Figure 14:
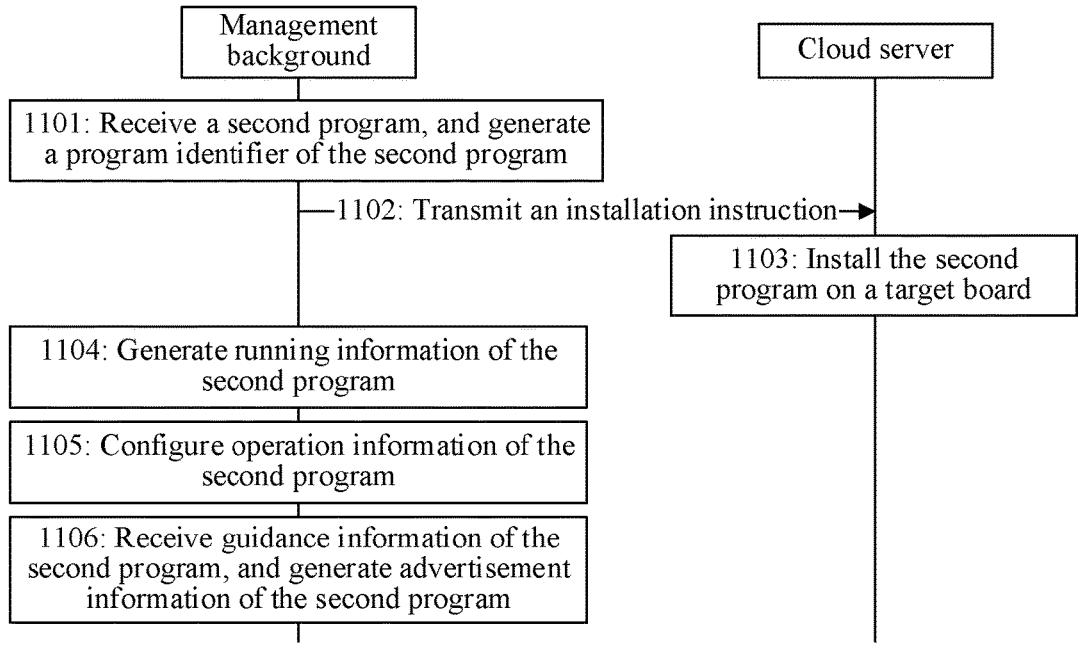
FIG. 14 is a flowchart of a program trial method according to another exemplary embodiment of the present disclosure.

FIG. 14 is a flowchart of a program trial method according to another exemplary embodiment of the present disclosure. The method may be performed by the computer system shown in FIG. 1, FIG. 2, or FIG. 3. The computer system includes: a terminal and a cloud server, where a first program and a trial SDK are running on the terminal. The method includes the following steps.

Step 1101: The management background receives a second program, and generates a program identifier of the second program.

For example, the management background is connected to the cloud server, and is configured to manage information in the cloud server.

For example, when a trial program needs to be added, a user uploads the second program to the management background, and the management background automatically generates the program identifier of the second program. For example, the management background stores an installation package of the second program into the cloud server.

Step 1102: The management background transmits an installation instruction to the cloud server.

Step 1103: The cloud server installs the second program on a target board.

A device that actually runs a program in the cloud server is referred to as a board or a board card, and a function of the device is equivalent to a computer main board. The program starts and runs on the board card of the cloud server, and transmits a rendered trial image frame to a trial SDK through a network after video coding through the cloud server. Each cloud server includes a plurality of board cards. Each board processes one program at a time. A single board card is referred to as a board card node, and each board card corresponds to one board card identifier.

Step 1104: The management background generates running information of the second program.

For example, the management background generates the running information of the second program according to an installation status of the second program on the cloud server.

The running information includes at least one of a server identifier, a board identifier of the target board on which the second program is installed, and the program identifier of the second program. The server identifier is an identifier of the cloud server.

Step 1105: The management background configures operation information of the second program.

The operation information includes at least one of rendering resolution of the second program, a program identifier of the first program, channel scenario information, and trial duration. For example, the channel scenario information is channel scenario information of a host program corresponding to the second program.

Step 1106: The management background receives guidance information of the second program, and generates advertisement information of the second program. In some embodiments, the cloud application is loaded with the trial setting on the cloud server before the trial event is triggered. The trial setting may include the guidance information and/or advertisement information.

The guidance information includes at least one of a guidance file, a key frame detection logic, and mask layer information. The advertisement information includes at least one of an advertisement type and an advertisement identifier.

For example, the advertisement type includes an incentive advertisement and a trial advertisement. The incentive advertising is a form of advertising in mobile games that uses incentives such as free game props or game currencies to attract users to actively tap and watch advertisements completely and then guide users to convert advertisements. For example, a game prompts that the user can revive a game role, double awards, and obtain a game prop free of charge after watching an advertisement completely. An advertisement entry of the game can be customized and distributed in each game stage scenario according to different content of the game. The trial advertisement is a form of advertisement embedded in a mobile game based on an experience program. In the mobile game, a user actively/passively triggers an advertisement, directly tries program content in an advertisement interface by using a cloud technology, and finally registers, downloads, or performs other conversion behaviors.

In conclusion, according to the method provided in this embodiment, the management background is set to manage data of each host program and a trial program in the cloud server, to add a trial program, to associate the host program with the trial program, and to configure a trial manner of the trial program, so as to implement fast management on the cloud server and simplify an operation and maintenance manner of the cloud server.

Figure 15:
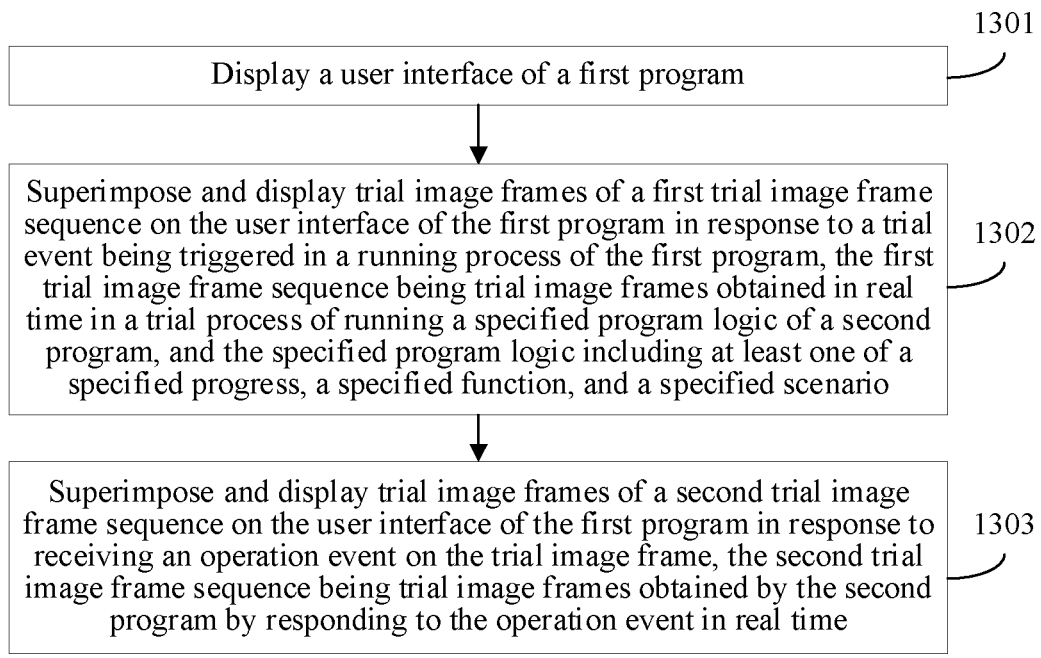
FIG. 15 is a flowchart of a program trial method according to another exemplary embodiment of the present disclosure.

FIG. 15 is a flowchart of a program trial method according to another exemplary embodiment of the present disclosure. The method may be performed by the terminal in the computer system shown in FIG. 1, FIG. 2, or FIG. 3. The method includes the following steps.

Step 1301: Display a user interface of a first program.

Figure 16:
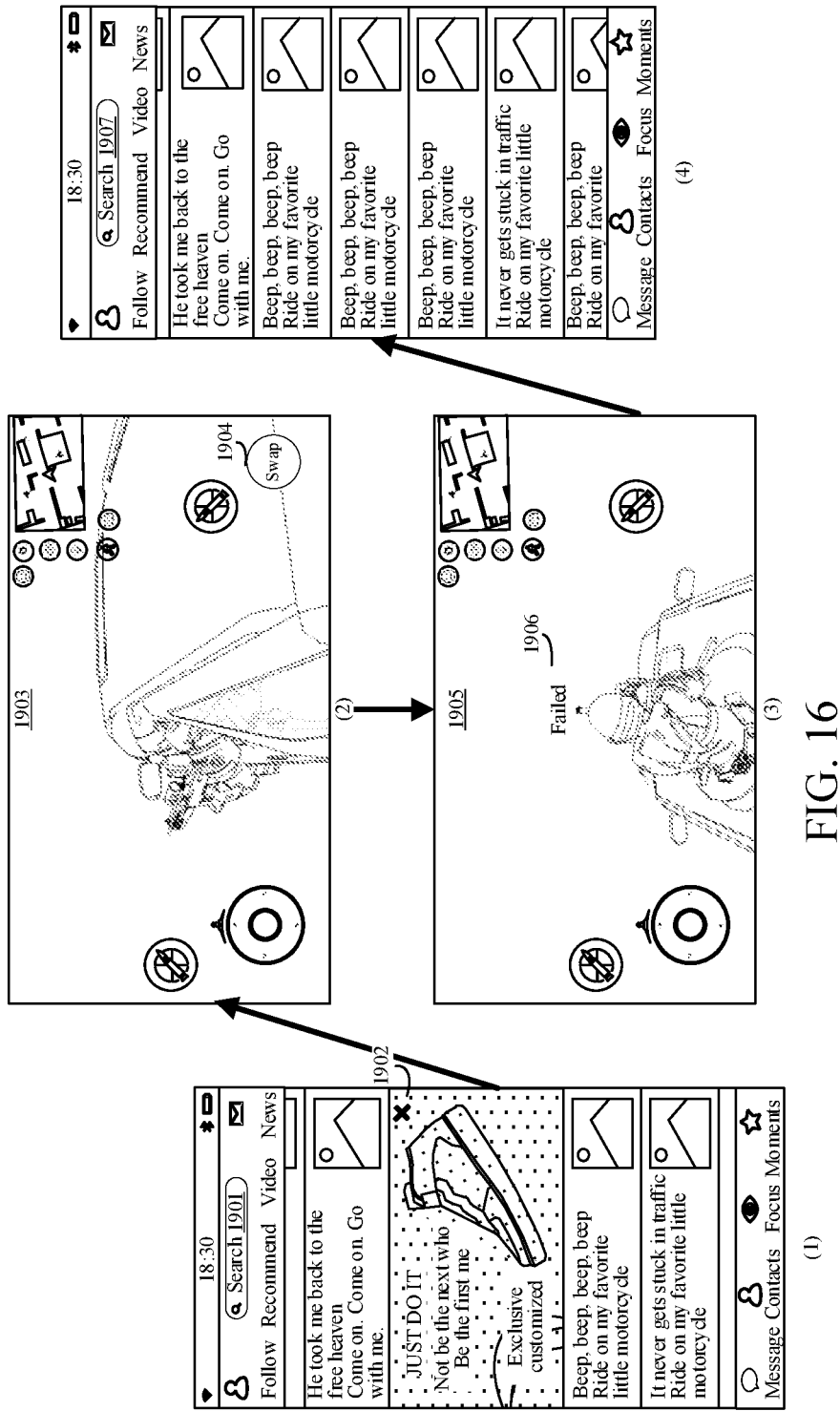
FIG. 16 is a schematic diagram of a user interface of a program trial method according to another exemplary embodiment of the present disclosure.

For example, as shown in (1) in FIG. 16, it is a user interface 1901 of the first program, the first program is a search engine program, and the user interface 1901 is an information browsing page of the search engine program.

In one embodiment, step 1301 may be replaced with: display the user interface of the first program, where a trial SDK is embedded in the first program, and the first program is a game program.

Step 1302: Superimpose and display trial image frames of a first trial image frame sequence on the user interface of the first program in response to a trial event being triggered in a running process of the first program, the first trial image frame sequence being trial image frames obtained in real time in a trial process of running a specified program logic of a second program, and the specified program logic including at least one of a specified progress, a specified function, and a specified scenario.

For example, as shown in (1) in FIG. 16, in a user interface 1801 of the first program, there is a close control 1902 for closing a page advertisement, and the user may disable the advertisement on the page by trying a second program. The user taps the close control 1902 to trigger a trial event. When the user taps the close control 1902, as shown in (2) in FIG. 16, a first trial image frame 1903 of the second program is superimposed and displayed on the user interface 1801 of the first program, where the first trial image frame 1903 completely covers the user interface 1801. The second program is a shooting game, and the specified program logic is a combat scenario of the shooting game, that is, the first trial image frame is a picture of a combat scenario in which the user tries to play the shooting game.

For example, "real time" refers to: the trial image frame in this embodiment is a trial image frame generated by running the second program in real time. That is, the trial image frame is not recorded in advance, but is generated in real time. According to different operation events received in the trial image frame, content displayed in the trial image frame is different. That is, the trial image frame may respond to an operation event in real time.

For example, because the second program runs on the cloud server, and is displayed on the terminal after the trial image frame is generated, a delay may exist in response of the trial image frame to the operation event.

For example, step 1302 may be replaced with: identify, in response to the trial event being triggered in the running process of the first program, a running status or a running scenario of the first program when the trial event is triggered; and determine the second program and the specified program logic of the second program based on the running status or the running scenario of the first program, and superimpose and display the trial image frames of the first trial image frame sequence on the user interface of the first program.

That is, different running statuses or running scenarios of the first program correspond to different second programs or different specified program logics of the same second program.

The terminal may automatically determine, by identifying the running scenario of the first program when the trial event is triggered, a second program that needs to be tried in this case and a specified program logic of the second program, so that different second programs may be automatically triggered in different running statuses/running scenarios of the first program. According to the association between different running statuses/running scenarios of the host program (the first program) and the trial program (the second program), trial of different trial programs may be placed for different running statuses/running scenarios, or trial of different program logics of the same trial program may be placed, thereby enriching the association and interaction between the host program and the trial program.

For example, the running status of the first program or the identification of the running scenario may be performed by the terminal, for example, may be identified by the first program in the terminal or may be identified by the trial SDK in the terminal; or may be identified by the cloud server.

For example, in response to a trial event being triggered in the running process of the first program, the first program identifies the running status or the running scenario of the first program when the trial event is triggered, and generates indication information, where the indication information is used for indicating the running status or the running scenario when the trial event is triggered. The first program transmits an invoke instruction to invoke the trial SDK, where the invoke instruction includes the indication information; after the trial SDK is invoked, a trial request is transmitted to the cloud server, where the trial request includes the indication information; and the cloud server determines the second program and the specified program logic of the second program based on the indication information.

For another example, in response to the trial event being triggered in the running process of the first program, the first program transmits an invoke instruction to invoke the trial SDK, where the invoke instruction includes scenario information (at least one of channel scenario information and a user interface screenshot of the first program); the trial SDK identifies, based on the scenario information, the running status or the running scenario of the first program when the trial event is triggered, to generate the indication information, where the indication information is used for indicating the running status or the running scenario when the trial event is triggered; the trial SDK transmits a trial request to the cloud server, where the trial request includes the indication information; and the cloud server determines the second program and the specified program logic of the second program based on the indication information.

For another example, in response to the trial event being triggered in the running process of the first program, the first program transmits an invoke instruction to invoke the trial SDK, where the invoke instruction includes scenario information (at least one of channel scenario information and a user interface screenshot of the first program); the trial SDK transmits a trial request to the cloud server, where the trial request includes the scenario information; and the cloud server identifies, based on the scenario information, the running status or the running scenario of the first program when the trial event is triggered, and determines the second program corresponding to the first program and the specified program logic of the second program.

For example, the identifying information (scenario information) used in the running status or the running scenario of the first program may include: program code run by the first program, a parameter generated/recorded during running of the first program, a user interface (a screenshot of the user interface) displayed by the first program, and the first program. For example, the scenario information includes at least one of a program identifier of the first program, channel scenario information of the first program, and an interface screenshot of the first program.

In one embodiment, step 1302 may be replaced with: in response to the trial event being triggered in the running process of the first program, the trial SDK transmits a trial request to the cloud server, where the trial request is used for requesting to try the second program, and the trial request includes: a program identifier of the first program, channel scenario information of a trial scenario of the first program, or the trial request includes an interface screenshot of the first program, and the second program is a cloud game program. The trial event includes a first trial event, and the first trial event includes: at least one of a game role killed, a specified mission completed, game pause, a request to obtain a specified prop, a game role winning, and a request to enter a specified mission. In response to receiving the first trial image frame sequence transmitted by the cloud server, trial image frames of the first trial image frame sequence are superimposed and displayed on the user interface of the first program, where the first trial image frame sequence is a trial image frame obtained by the cloud server by running the specified program logic of the second program, and the specified program logic is determined by the cloud server according to the program identifier and the channel scenario information in the trial request, or the second program and the specified program logic are determined by the cloud server according to an identification result obtained by identifying the interface screenshot; and the specified program logic includes at least one of a program of a specified progress, a program of a specified function, and a program of a specified scenario. The cloud server is configured to: generate, by using the second program, the trial image frame of the second program on a first display screen by using a graphics library and a graphics processor (GPU).

Step 1303: Superimpose and display trial image frames of a second trial image frame sequence on the user interface of the first program in response to receiving an operation event on one of the trial image frames, the second trial image frame sequence being trial image frames obtained by the second program by responding to the operation event in real time.

For example, as shown in (2) in FIG. 16, when the user taps a swap control 1904 on a first trial image frame 1903, a second trial image frame 1905 shown in (3) in FIG. 16 is displayed, and the second trial image frame 1905 displays a picture in which a game role is displaced from a driving position to a vehicle roof position.

For example, as shown in (3) in FIG. 16, when detecting that a text "fail" exists in the second trial image frame, the cloud server determines that the trial ends current time, and transmits a trial end instruction when transmitting the trial image frame to the terminal. The terminal ends this trial according to the trial end instruction, and displays an information page 1907 shown in (4) in FIG. 16. In this case, advertisement content is removed from the information page 1907, and advertisement in the information page of the first program is successfully removed by the user by trying the second program.

In one embodiment, step 1303 may be replaced with: transmit an operation event to the cloud server by using a trial SDK in response to receiving the operation event on the trial image frame. The operation event is generated according to the trigger operation, and the trial SDK is used for periodically recording position information of a touch point that is generated by the user on the display screen, to generate the operation event. The trial SDK is used for establishing a rectangular coordinate system by using directions parallel to bezels of the display screen as x and y axes and any point on the display screen as an origin, to record position coordinates of a touch point on the rectangular coordinate system. The cloud server is configured to: receive an operation event by using a first network transmission module, input the operation event into a graphics library of the second program, generate a trial image frame of the second program according to the operation event, and then transmit the new trial image frame to the terminal for display by using video coding and the first network transmission module, to form a video stream. The superimposing and displaying the trial image frames of the second trial image frame sequence on the user interface of the first program in response to receiving the second trial image frame sequence transmitted by the cloud server, the second trial image frame sequence being trial image frames obtained by the cloud server by controlling the second program to respond to the operation event includes: a display priority of the trial SDK is higher than a display priority of the first program, and the trial image frame of the trial SDK is displayed on an upper layer of the user interface of the first program.

In conclusion, according to the method provided in this embodiment, a specified program logic of a program is displayed to a user in a program trial manner, so that the user tries a function, progress, or scenario of the program, so that the user can intuitively understand the program by trying the program. In this method, based on a cloud technology, a specified program logic of a trial program is run in a cloud server, and the cloud server generates a trial image frame according to a running result, and transmits the trial image frame to a terminal. A trial SDK on the terminal decodes and displays the trial image frame, so that a picture of the trial program can be displayed on the terminal without installing the trial program. When the terminal receives an operation of the user on the trial picture, the SDK uploads the operation to the cloud server, and the cloud server controls the second program to generate a new trial image frame in response to the user operation, so that the user can control the second program and try the second program. Compared with a conventional video advertisement, the method does not need to produce a promotional video frame by frame, but instead generates and displays a picture by running an trial program in real time. During production of a promotional file, only a related interface needs to be invoked to run the trial program on the cloud server, thereby reducing costs required for the terminal to try the program and improving trial efficiency.

The present disclosure further provides an example embodiment in which the program trial method provided in the present disclosure is used in an advertisement.

For example, when an advertiser wants to place an trial program in a host program, so as to achieve an objective of promoting the trial program, the advertiser may add the trial program to the cloud server by using the management background, and configure a related parameter of the advertisement, for example, specify a function of the trial program.

When the user triggers a trial event in the host program, the host program invokes the trial SDK to transmit a trial request to the cloud server. The cloud server determines an trial program for this trial program according to the trial request, runs a specified function of the trial program, returns the generated trial picture to the trial SDK for display. The trial SDK can receive an operation event of the user on the user interface, returns the operation event to the cloud server, and the cloud server generates a new trial picture according to the operation event of the user, and returns the trial picture to the trial SDK again. In this way, the user can directly try the specified function of the trial program on the terminal. If the user wants to continue to use the trial program after the trial, the user can download the trial program by taping the download control on the trial picture. For example, the trial program may be a game program.

Figure 17:
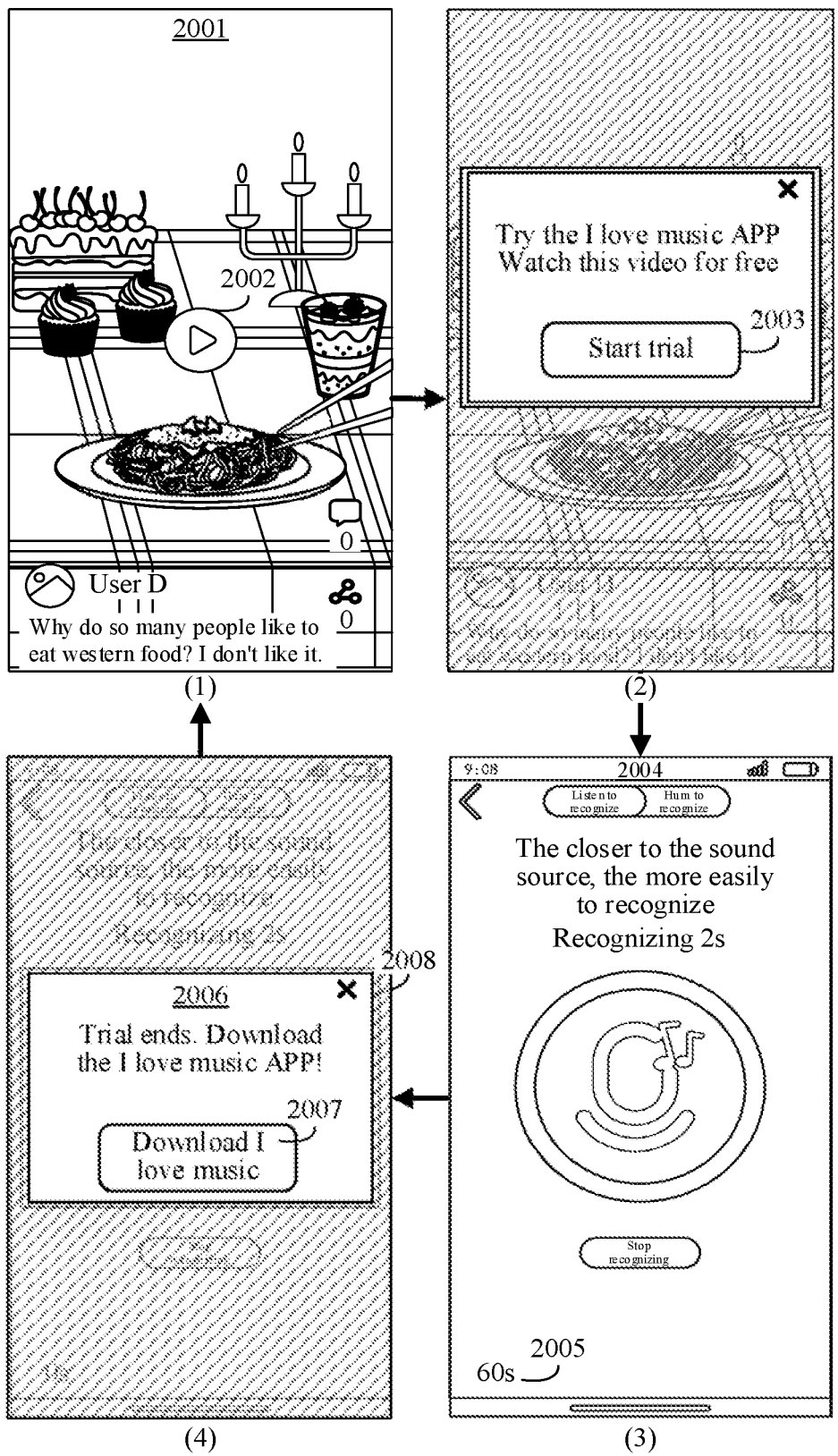
FIG. 17 is a schematic diagram of a user interface of a program trial method according to another exemplary embodiment of the present disclosure.

For example, the second program (I love music APP) puts a trial advertisement in the first program (video playback program). As shown in (1) in FIG. 17, when the user taps a video play control 2002 of a first video on a user interface 2001 of a video playback program, as shown in (2) in FIG. 17, a trial pop-up window of the I love music APP pops up on the user interface 2001, and a trial control 2003 of the I love music APP is displayed on the trial pop-up window. After the user taps the trial control 2003, the user starts to try the audition and song recognition function of the music-loving APP. As shown in (3) in FIG. 17, a music recognition interface 2004 of the I love music APP is displayed. For example, after the user starts to try the music recognition function, a trial time countdown 2005 of this trial is further displayed on the music recognition interface 2004. When the countdown 2005 ends, as shown in (4) in FIG. 17, a download mask layer 2006 is displayed on the music recognition interface 2004, and there is a download control 2007 of the I love music APP on the download mask layer 2006. The user taps the download control 2007 to start to download the I love music APP. Alternatively, the user may tap an exit control 2008 on the download mask layer 2006 to exit the trial, and display the user interface 2001 shown in (1) in FIG. 17. In this case, the user obtains a qualification of watching the first video, and the terminal may automatically play the first video, or the user taps the play control 2002 again to start playing the first video.

Figure 18:
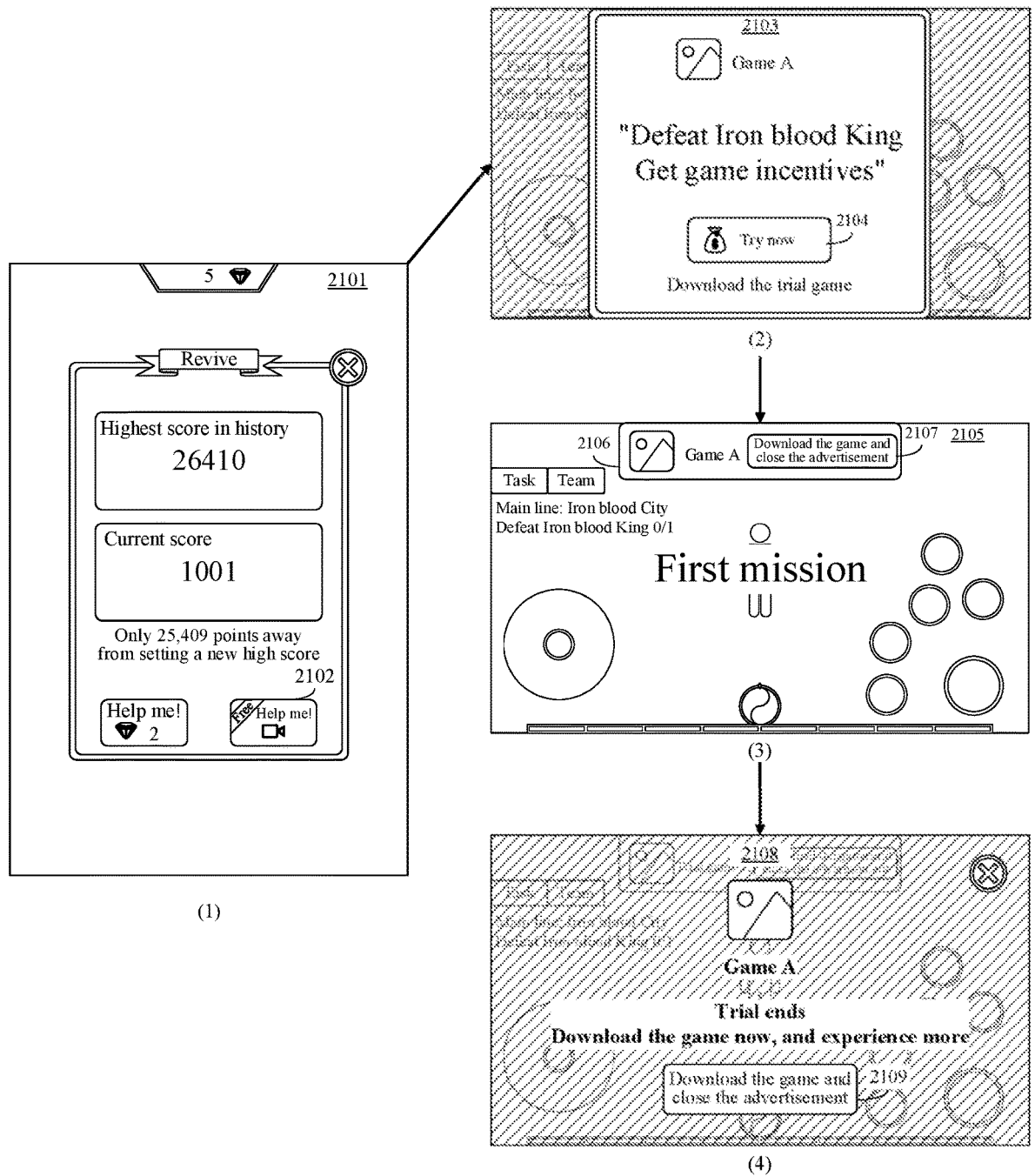
FIG. 18 is a schematic diagram of a user interface of a program trial method according to another exemplary embodiment of the present disclosure.

For another example, the second program (game A) puts a trial advertisement in the first program (escape game). As shown in (1) in FIG. 18, when a game role controlled by the user in the escape game is dead, a user interface 2101 of reviving the game role is displayed. For example, as shown in (1) in FIG. 18, in the user interface 2101, there is a help-me control 2102 for trial to play a game A to revive a game role. The user taps the help-me control 2102 to trigger a trial event. A presentation image frame 2103 of the game A shown in (2) in FIG. 18 is displayed. A trial control 2104 of the game A is displayed on the presentation image frame. The user taps the trial control 2104 to start to play the first mission of the game A. As shown in (3) in FIG. 18, a trial image frame 2105 of the first mission of the game A is displayed. A download mask layer 2106 of the game A is displayed on the trial image frame 2105. The user may at any time tap a download control 2107 of the download mask layer 2106 to download the game A and exit trial. After the user passes through the first mission of the game A, the trial ends. As shown in (4) in FIG. 18, a trial end mask layer 2108 is displayed on the trial image frame, and a download control 2109 of the game A is displayed on the trial end mask layer 2108. The user may tap the download control 2109 to download the game A.

Figure 19:
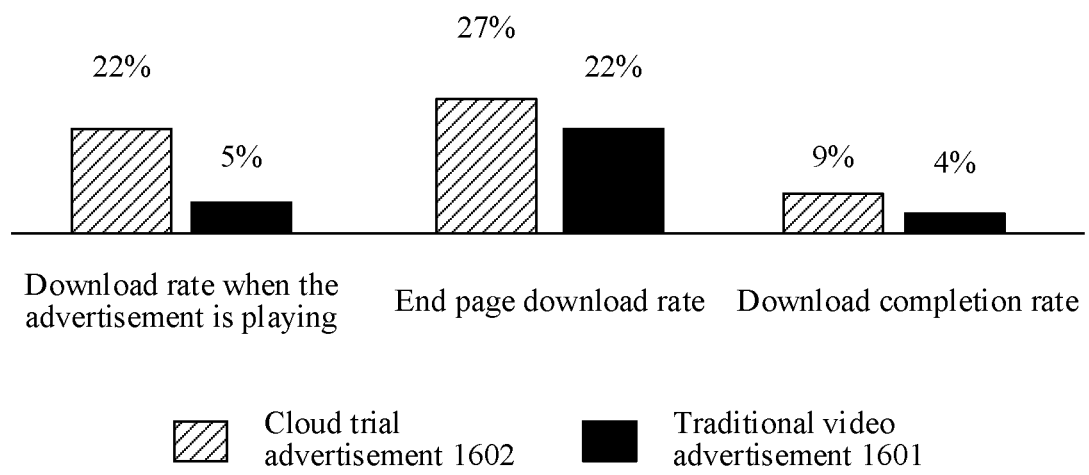
FIG. 19 is a schematic diagram of an effect of a program trial method according to another exemplary embodiment of the present disclosure.

For example, as shown in FIG. 19, compared with some existing video advertisement 1601, a cloud trial advertisement 1602 produced by using the program trial method provided in the present disclosure is much higher than the existing video advertisement 1601 in a download rate of the play advertisement, an end page download rate is slightly higher than that of the existing video advertisement 1601, and a download completion rate is more than twice of the existing video advertisement 1601.

In conclusion, according to the method provided in this embodiment, content of an trial program may be displayed on a terminal on which the trial program is not installed, and specified game progress or a specified game mission of the trial program may be directly run, so as to display a game core playing method or plot, thereby greatly improving content quality of a trial advertisement. In addition, it is allowed to customize mask pictures and words on the trial picture to promote the target games and improve the advertisement quality, so as to simplify the operations required to add additional display information on the trial picture. Through lightweight adjustment on the cloud, the game experience progress/mission/content in the advertisement can be replaced at any time, thus greatly reducing the costs of advertisement injecting trial and error. Any host program that supports the Android operating system may be created as a cloud game trial advertisement, and advertised across systems and terminals.

For example, in one embodiment, the cloud server includes three physical servers: an advertisement server, a running server, and a configuration server. For example, the advertisement server is configured to store operation information of the first program and operation information of the second program, and a board is disposed on the running server, so as to run the second program and configure a guidance file that is on the server and that is used for invoking the specified program logic of the second program. This embodiment is described by using an example in which the three physical servers share the same database.

Figure 20:
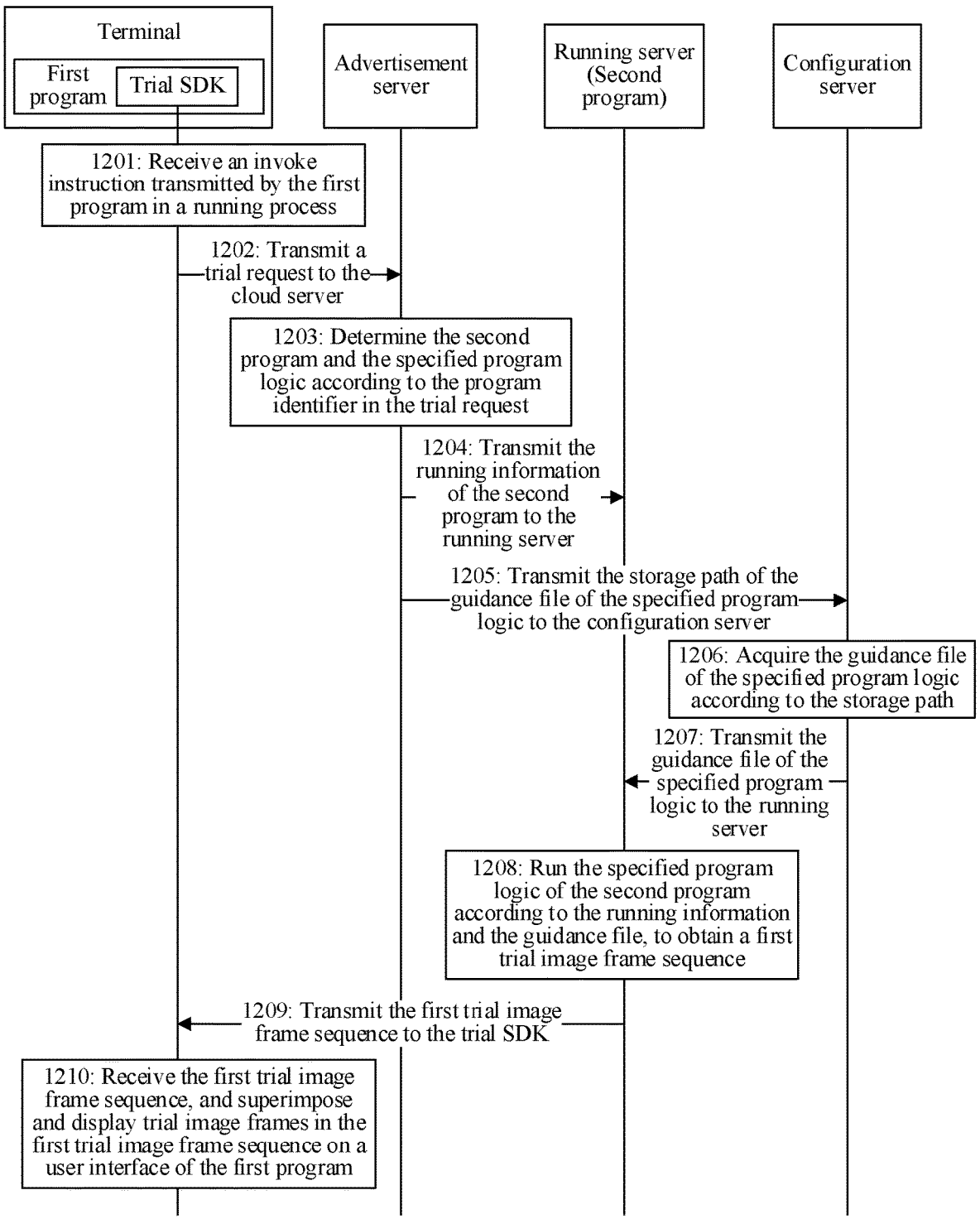
FIG. 20 is a flowchart of a program trial method according to another exemplary embodiment of the present disclosure.

FIG. 20 is a flowchart of a program trial method according to another exemplary embodiment of the present disclosure. The method may be performed by a terminal, an advertisement server, a running server, and a configuration server. The method includes the following steps.

Step 1201: The trial SDK receives an invoke instruction transmitted by the first program in a running process.

Step 1202: The trial SDK transmits a trial request to the cloud server.

Step 1203: The advertisement server receives the trial request, and determines the second program and the specified program logic according to a program identifier in the trial request.

For example, the advertisement server queries the second program and the specified program logic of this trial according to information such as an identifier of the first program and a channel scenario identifier that are carried in the trial request. After the second program and the specified program logic are queried, running information of the second program on the running server is acquired, for example, a running server identifier and a board identifier. At the same time, a storage path of a guidance file of the specified program logic is acquired.

For example, the advertisement server may further return program introduction information of the second program to the trial SDK, so that the trial SDK first displays a presentation image frame of the second program according to the program introduction information.

For example, the advertisement server may further return the running information of the second program to the trial SDK, so that the trial SDK and the running server interwork data generated during running of the second program.

Step 1204: The advertisement server transmits the running information of the second program to the running server.

Step 1205: The advertisement server transmits the storage path of the guidance file of the specified program logic to the configuration server.

Step 1206: The configuration server acquires the guidance file of the specified program logic according to the storage path.

Step 1207: The configuration server transmits the guidance file of the specified program logic to the running server.

Step 1208: The running server runs the specified program logic of the second program according to the running information and the guidance file, to obtain a first trial image frame sequence.

For example, the running server replaces the original guidance file of the second program with the guidance file transmitted by the configuration server, and then runs the second program to run the specified program logic of the second program.

Step 1209: The running server transmits the first trial image frame sequence to the trial SDK.

Step 1210: The trial SDK receives the first trial image frame sequence, and superimposes and displays trial image frames of the first trial image frame sequence on a user interface of the first program.

Thereafter, the running server transmits, to the trial SDK in real time, the trial image frame generated in the running process of the second program, and the trial SDK transmits the operation event of the user to the running server in real time, so that the running server controls the second program to respond to the operation event of the user to generate a new trial image frame.

In conclusion, according to the method provided in this embodiment, the advertisement server, the running server, and the configuration server are respectively responsible for an operation of an advertisement-related logic, an operation of a running-related logic of the second program, an operation of a related logic of the specified program logic, and three physical servers are used for cooperating to complete the program trial method performed by the cloud server, thereby improving program trial efficiency.

Figure 21:
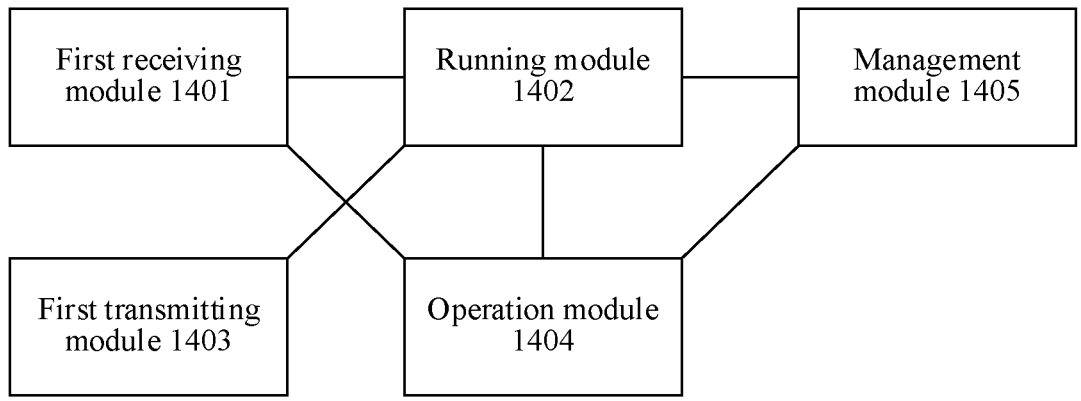
FIG. 21 is a schematic diagram of a program trial apparatus according to another exemplary embodiment of the present disclosure.

FIG. 21 is a block diagram of a program trial apparatus according to an exemplary embodiment of the present disclosure. The apparatus may be implemented as all or a part of a cloud server. The apparatus includes the following modules:

a first receiving module 1401, configured to receive a trial request transmitted by a trial SDK;

a running module 1402, configured to run a specified program logic of a second program to obtain a first trial image frame sequence, the specified program logic including at least one of a program of a specified progress, a program of a specified function, and a program of a specified scenario; the trial request being transmitted by the trial SDK in response to an invoke instruction transmitted by a first program in a running process, the trial request being used for requesting to try the second program, and the first program and the trial SDK running on a same terminal; and a first transmitting module 1403, configured to transmit the first trial image frame sequence to the trial SDK, the first trial image frame sequence being used for causing the trial SDK to superimpose and display trial image frames of the first trial image frame sequence on a user interface of the first program;

the first receiving module 1401 being further configured to receive an operation event transmitted by the trial SDK;

the running module 1402 being further configured to control the second program to respond to the operation event in real time to obtain a second trial image frame sequence, the operation event being received by the trial SDK on the trial image frame; and the first transmitting module 1403 being further configured to transmit the second trial image frame sequence to the trial SDK, the second trial image frame sequence being used for causing the trial SDK to superimpose and display trial image frames of the second trial image frame sequence on a user interface of the first program.

In one embodiment, the trial request includes indication information, and the indication information is used for indicating a running status or a running scenario of the first program when the trial event is triggered; and an operation module 1404 is configured to determine the second program and the specified program logic of the second program based on the indication information.

In one embodiment, the trial request includes scenario information, and the scenario information is used for describing a running status or a running scenario of the first program when the trial event is triggered; and an operation module 1404 is configured to identify the scenario information, and determine the second program and the specified program logic of the second program based on an identification result of the scenario information.

In one embodiment, the scenario information includes at least one of a program identifier of the first program, channel scenario information of the first program, and an interface screenshot of the first program.

In one embodiment, the apparatus further includes:

an operation module 1404, configured to determine a guidance file of the specified program logic according to the trial request; and the running module 1402 is further configured to run the specified program logic of the second program according to the guidance file to obtain the first trial image frame sequence.

In one embodiment, the invoke instruction includes a program identifier of the first program, and the trial request includes a program identifier;

the operation module 1404 is further configured to determine the second program and a storage path of the guidance file of the specified program logic according to the program identifier in the trial request; and the running module 1402 is further configured to acquire the guidance file of the specified program logic according to the storage path.

In one embodiment, the invoke instruction further includes channel scenario information of a trial scenario of the first program, and the trial request further includes the channel scenario information; and the operation module 1404 is further configured to determine the second program and the specified program logic according to the program identifier and the channel scenario information that are in the trial request.

In one embodiment, the invoke instruction further includes user information stored in the first program, and the trial request further includes the user information; and the operation module 1404 is further configured to determine the second program and the specified program logic according to the program identifier and the user information in the trial request.

In one embodiment, the invoke instruction further includes an interface screenshot of the first program, and the trial request further includes the interface screenshot;

the operation module 1404 is further configured to identify the interface screenshot to obtain an identification result; and the operation module 1404 is further configured to determine the second program and the specified program logic according to the identification result and the program identifier in the trial request.

In one embodiment, in response to the second program being a locally archived program, the guidance file includes an archived file; and in response to the second program being a network archived program, the guidance file includes a configuration file.

In one embodiment, the first transmitting module 1403 is further configured to transmit program introduction information of the second program to the trial SDK, where the program introduction information is used for displaying a presentation image frame of the second program.

In one embodiment, a trial control is displayed on the presentation image frame;

the first receiving module 1401 is further configured to receive a video acquisition request transmitted by the SDK; and the first transmitting module 1403 is further configured to transmit the first trial image frame sequence to the trial SDK in response to receiving the video acquisition request, where the video acquisition request is transmitted by the trial SDK in response to receiving a trigger operation on the trial control.

In one embodiment, the running module 1402 is further configured to: in response to detecting a first key frame in the trial image frame, the cloud server controls the second program to respond to an operation instruction corresponding to the first key frame, where the operation instruction is used for completing a specified operation in the second program, and the trial image frame is a trial image frame in the first trial image frame sequence or the second trial image frame sequence;

the running module 1402 is further configured to: in response to detecting a second key frame in the trial image frame, acquire mask layer information corresponding to the second key frame; and the first transmitting module 1403 is further configured to: when transmitting the second key frame to the trial SDK, transmit the mask layer information to the trial SDK, where the mask layer information is used for controlling the trial SDK to display a customized mask layer on the second key frame.

In one embodiment, the first receiving module 1401 is further configured to receive a download request of the second program transmitted by the SDK; and the first transmitting module 1403 is further configured to transmit the second program to the trial SDK in response to receiving a download request of the second program transmitted by the trial SDK.

In one embodiment, the first receiving module 1401 is further configured to receive an end instruction transmitted by the SDK; and the running module 1402 is further configured to stop running the second program in response to receiving the end instruction transmitted by the trial SDK.

In one embodiment, when the first program is a game program, and an invoke instruction is transmitted by the first program in response to triggering a first trial event, the first trial event includes: at least one of a game role killed, a specified mission completed, game pause, a request to obtain a specified prop, a game role winning, and a request to enter a specified mission; or when the first program is a content browsing program, and the invoke instruction is transmitted by the first program in response to triggering a second trial event, the second trial event includes: at least one of browsing specified content, browsing duration reaching specified duration, a request to unlock a specified function, and a request to browse specified content; or when the first program is a video playback program, and the invoke instruction is transmitted by the first program in response to triggering a third trial event, the third trial event includes: at least one of play duration reaching specified duration, playing a specified video, a request to shorten advertisement time, and a request to play a specified video.

In one embodiment, the apparatus further includes:

a management module 1405, configured to receive the second program, and generate a program identifier of the second program;

the running module 1402 is further configured to install the second program on a target board; and the management module 1405 is further configured to generate running information of the second program, where the running information includes at least one of a server identifier, a board identifier of the target board on which the second program is installed, and the program identifier of the second program.

In one embodiment, the management module 1405 is further configured to configure operation information of the second program, where the operation information includes at least one of rendering resolution, channel scenario information, and trial duration of the second program.

In one embodiment, the management module 1405 is further configured to receive guidance information of the second program, where the guidance information includes at least one of a guidance file and a key frame detection logic; and generate advertisement information of the second program, where the advertisement information includes at least one of an advertisement type and an advertisement identifier.

Figure 22:
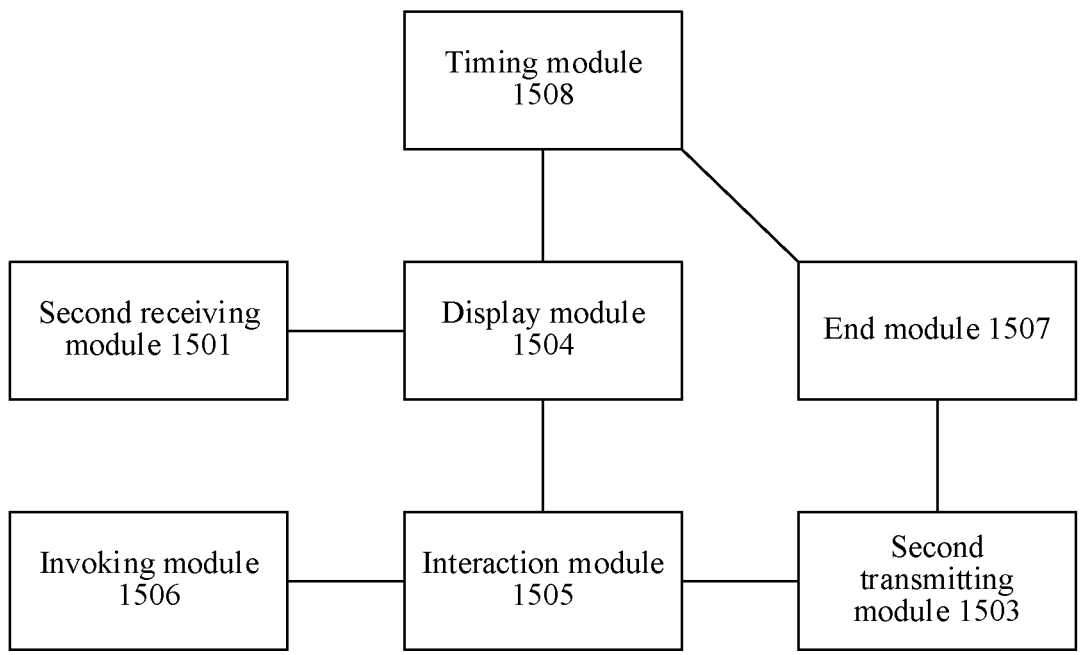
FIG. 22 is a schematic diagram of a program trial apparatus according to another exemplary embodiment of the present disclosure.

FIG. 22 is a block diagram of a program trial apparatus according to another exemplary embodiment of the present disclosure. The apparatus may be implemented as all or part of the terminal. The apparatus includes the following modules:

a display module 1504, configured to display a user interface of a first program;

the display module 1504 being further configured to: superimpose and display trial image frames of a first trial image frame sequence on the user interface of the first program in response to a trial event being triggered in a running process of the first program, the first trial image frame sequence being trial image frames obtained in real time in a trial process of running a specified program logic of a second program, and the specified program logic including at least one of a program of a specified progress, a program of a specified function, and a program of a specified scenario; and an interaction module 1505, configured to receive an operation event on one of the trial image frames;

the display module 1504 being further configured to: superimpose and display trial image frames of a second trial image frame sequence on the user interface of the first program in response to receiving an operation event on one of the trial image frames, the second trial image frame sequence being trial image frames obtained by the second program by responding to the operation event in real time.

In one embodiment, the display module 1504 is further configured to: identify, in response to the trial event being triggered in the running process of the first program, a running status or a running scenario of the first program when the trial event is triggered; and the display module 1504 is further configured to: determine the second program and the specified program logic of the second program based on the running status or the running scenario of the first program, and superimpose and display the trial image frames of the first trial image frame sequence on the user interface of the first program;

the first trial image frame sequence being trial image frames obtained by running the specified program logic of the second program, and the specified program logic including at least one of a program of a specified progress, a program of a specified function, and a program of a specified scenario.

In one embodiment, the display module 1504 is further configured to acquire scenario information, the scenario information describing the running status or the running scenario of the first program when the trial event is triggered;

the display module 1504 is further configured to identify the scenario information to generate indication information, the indication information indicating the running status or the running scenario;

the second transmitting module 1503 is configured to transmit a trial request to a cloud server by using a trial SDK, the trial request being used for requesting to try the second program, and the trial request including the indication information; and the display module 1504 is further configured to: superimpose and display the trial image frames of the first trial image frame sequence on the user interface of the first program in response to receiving the first trial image frame sequence transmitted by the cloud server;

the first trial image frame sequence being trial image frames obtained in real time by the cloud server in a process of running the specified program logic of the second program, and the second program and the specified program logic of the second program being determined by the cloud server based on the indication information.

In one embodiment, the display module 1504 is further configured to acquire scenario information, the scenario information describing the running status or the running scenario of the first program when the trial event is triggered;

the second transmitting module 1503 is configured to transmit a trial request to a cloud server by using a trial SDK, the trial request being used for requesting to try the second program, and the trial request including the scenario information; and the display module 1504 is further configured to: superimpose and display the trial image frames of the first trial image frame sequence on the user interface of the first program in response to receiving the first trial image frame sequence transmitted by the cloud server;

the first trial image frame sequence being trial image frames obtained in real time by the cloud server in a process of running the specified program logic of the second program, and the second program and the specified program logic of the second program being determined by the cloud server after identifying the scenario information.

In one embodiment, the scenario information includes at least one of a program identifier of the first program, channel scenario information of the first program, and an interface screenshot of the first program.

In one embodiment, the apparatus further includes:

a second transmitting module 1503, configured to transmit a trial request to the cloud server by using the trial SDK in response to a trial event being triggered in the running process of the first program, where the trial request is used for requesting to try the second program; and a second receiving module 1501, configured to receive the first trial image frame sequence transmitted by the cloud server;

the display module 1504 being further configured to: superimpose and display trial image frames of the first trial image frame sequence on the user interface of the first program in response to receiving the first trial image frame sequence transmitted by the cloud server, where the first trial image frame sequence is a trial image frame obtained in real time by the cloud server in the process of running the specified program logic of the second program.

In one embodiment, the apparatus further includes:

a second transmitting module 1503, configured to: transmit an operation event to the cloud server by using a trial SDK in response to receiving the operation event on the trial image frame; and a second receiving module 1501, configured to receive a second trial image frame sequence transmitted by the cloud server;

the display module 1504 being further configured to: superimpose and display the trial image frames of the second trial image frame sequence on the user interface of the first program in response to receiving the second trial image frame sequence transmitted by the cloud server, the second trial image frame sequence being trial image frames obtained by the cloud server by controlling the second program to respond to the operation event in real time.

In one embodiment, the trial request includes a program identifier of the first program, and the second program and the specified program logic are determined by the cloud server according to the program identifier.

In one embodiment, the trial request further includes channel scenario information of a trial scenario of the first program; and the second program and the specified program logic are determined by the cloud server according to the program identifier and the channel scenario information.

In one embodiment, the trial request further includes user information stored in the first program; and the second program and the specified program logic are determined by the cloud server according to the program identifier and the user information.

In one embodiment, the trial request further includes an interface screenshot of the first program; and the second program and the specified program logic are determined by the cloud server according to an identification result obtained by identifying the interface screenshot and the program identifier.

In one embodiment, the apparatus further includes:

a second receiving module 1501, configured to receive program introduction information of the second program transmitted by the cloud server; and the display module 1504 is further configured to: superimpose and display a presentation image frame of the second program on the user interface of the first program according to program introduction information in response to receiving the program introduction information of the second program transmitted by the cloud server.

In one embodiment, a trial control is displayed on the presentation image frame;

the interaction module 1505 is further configured to receive a trigger operation on the trial control; and the second transmitting module 1503 is further configured to: in response to receiving a trigger operation on the trial control, transmit a video acquisition request to the cloud server by using the trial SDK, where the video acquisition request is used for requesting to acquire the first trial image frame sequence.

In one embodiment, the apparatus further includes:

a second receiving module 1501, configured to receive, by using the trial SDK, a second key frame and mask layer information that are transmitted by the cloud server, where the second key frame is corresponding to the mask layer information; and the display module 1504 is further configured to: display a customized mask layer on the second key frame according to the mask layer information in response to displaying the second key frame.

In one embodiment, a first download mask layer is displayed on the trial image frame, and the first download mask layer includes a first download control; and the apparatus further includes:

the interaction module 1505 is further configured to receive a trigger operation on the first download control; and the invoking module 1506 is configured to: invoke, by using the trial SDK in response to receiving a trigger operation on the first download control, the first program to download the second program; or the second transmitting module 1503 is configured to transmit a download request for downloading the second program to the cloud server; or the invoking module 1506 is further configured to invoke a third-party program to download the second program.

In one embodiment, the apparatus further includes:

a timing module 1508, configured to time a trial time of the second program; and an end module 1507, configured to end a trial process in response to the trial time reaching trial duration; or the display module 1504 is configured to display a second download mask layer in response to the trial time reaching trial duration, where the second download mask layer includes a second download control and a first exit control;

the interaction module 1505 is further configured to receive a trigger operation the second download control or on the first exit control;

the end module 1507 is further configured to end the trial process in response to receiving a trigger operation on the second download control or the first exit control; or the end module 1507 is further configured to end the trial process in response to displaying a third key frame; or the display module 1504 is further configured to display, in response to displaying a third key frame, a third download mask layer corresponding to the third key frame, the third download mask layer including a third download control and a second exit control;

the interaction module 1505 is further configured to receive a trigger operation on the third download control or the second exit control; and the end module 1507 is further configured to end the trial process in response to receiving a trigger operation on the third download control or the second exit control.

In one embodiment, the first program is a game program, the trial event includes a first trial event, and the first trial event includes: at least one of a game role killed, a specified mission completed, game pause, a request to obtain a specified prop, a game role winning, and a request to enter a specified mission; or the first program is a game program, the trial event includes a second trial event, and the second trial event includes: at least one of browsing specified content, browsing duration reaching specified duration, a request to unlock a specified function, and a request to browse specified content; or the first program is a game program, the trial event includes a third trial event, and the third trial event includes: at least one of play duration reaching specified duration, playing a specified video, a request to shorten advertisement time, and a request to play a specified video.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 23:
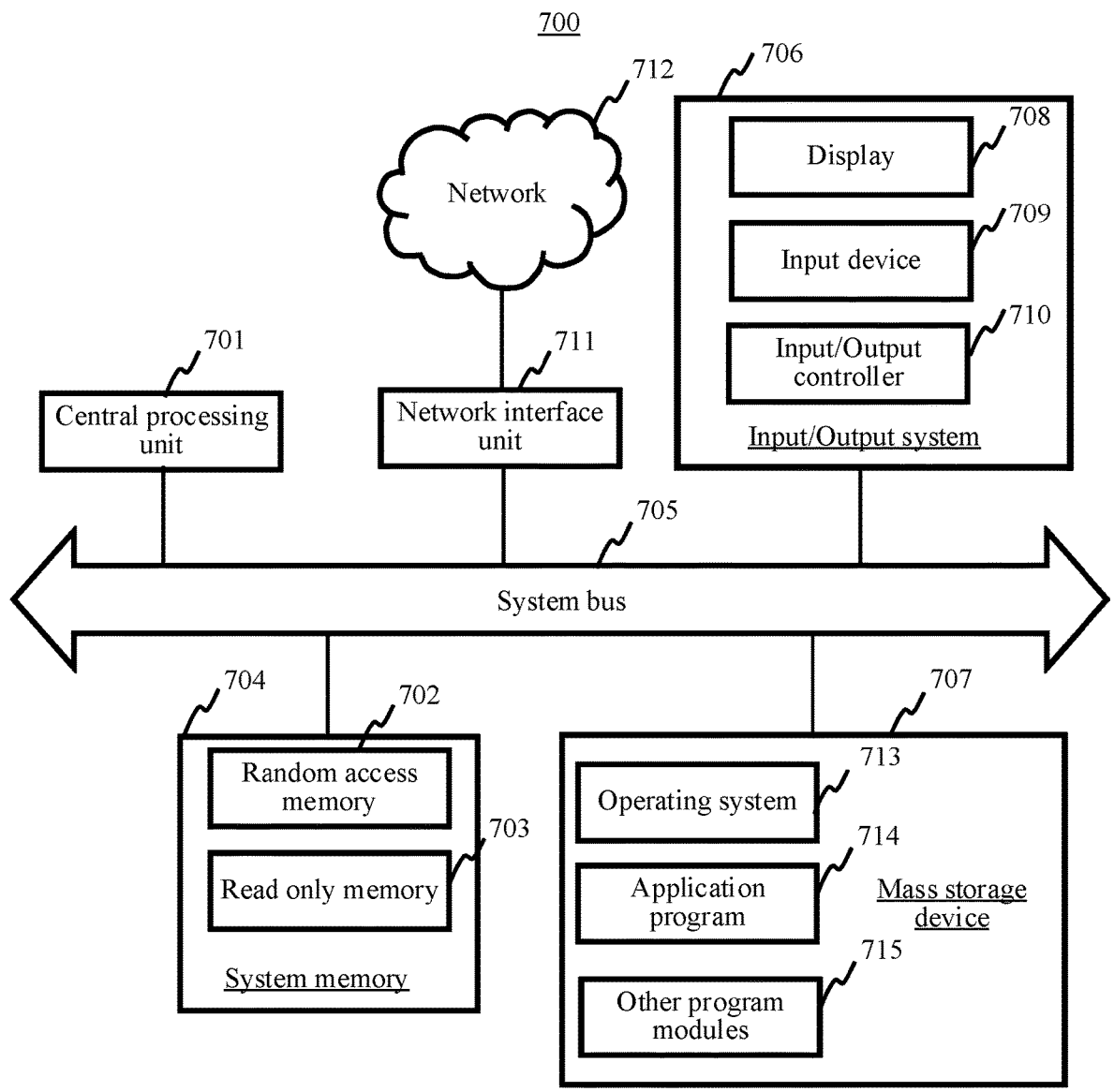
FIG. 23 is a block diagram of a server according to an exemplary embodiment of the present disclosure.

FIG. 23 is a schematic structural diagram of a server according to an embodiment of the present disclosure. Specifically, the server 700 includes a central processing unit (CPU) 701, a system memory 704 that includes a random access memory (RAM) 702 and a read-only memory (ROM) 703, and a system bus 705 that is connected to the system memory 704 and the central processing unit 701. The server 700 further includes a basic input/output (I/O) system 706 assisting in transmitting information between devices in a computer, and a mass storage device 707 configured to store an operating system 713, an application program 714 and another program module 715.

The basic I/O system 706 includes a display 708 configured to display information, and an input device 709 configured to allow a user to enter information, for example, a mouse, or a keyboard. The display 708 and the input device 709 are both connected to the CPU 701 by using an input/output controller 710 connected to the system bus 705. The basic input/output system 706 may further include the input/output controller 710 configured to receive and process input from multiple other devices such as the keyboard, the mouse, or an electronic stylus. Similarly, the input/output controller 710 further provides an output to a display screen, a printer, or another type of output device.

The mass storage device 707 is connected to the CPU 701 by using a mass storage controller (not shown) connected to the system bus 705. The mass storage device 707 and a computer-readable medium associated with the mass storage device provide non-volatile storage for the server 700. That is, the large-capacity storage device 707 may include a computer-readable medium (not shown) such as a hard disk or a compact disc read-only memory (CD-ROM) drive.

Generally, the computer-readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an erasable programmable read-only memory (EPROM), an electrically erasable programmable read-only memory (EEPROM), a flash memory, or another solid-state storage technology, a CD-ROM, a digital versatile disc (DVD), or another optical storage, magnetic tape cassette, magnetic tape, magnetic disk storage, or another magnetic storage device. Certainly, a person skilled in the art may know that the computer storage medium is not limited to the foregoing types. The system memory 704 and the mass storage device 707 described above may be collectively referred to as memory.

According to various embodiments of the present disclosure, the server 700 may further be connected, by using a network such as the Internet, to a remote computer on the network and run. That is, the server 700 may be connected to a network 712 by using a network interface unit 711 that is connected to the system bus 705, or may be connected to a network of another type or a remote computer system (not shown) by using the network interface unit 711.

The present disclosure further provides a terminal, including a processor and a memory, the memory storing at least one instruction, the at least one instruction being loaded and executed by the processor to implement the program trial method provided in the foregoing method embodiments. The terminal may be a terminal provided in FIG. 24 below.

Figure 24:
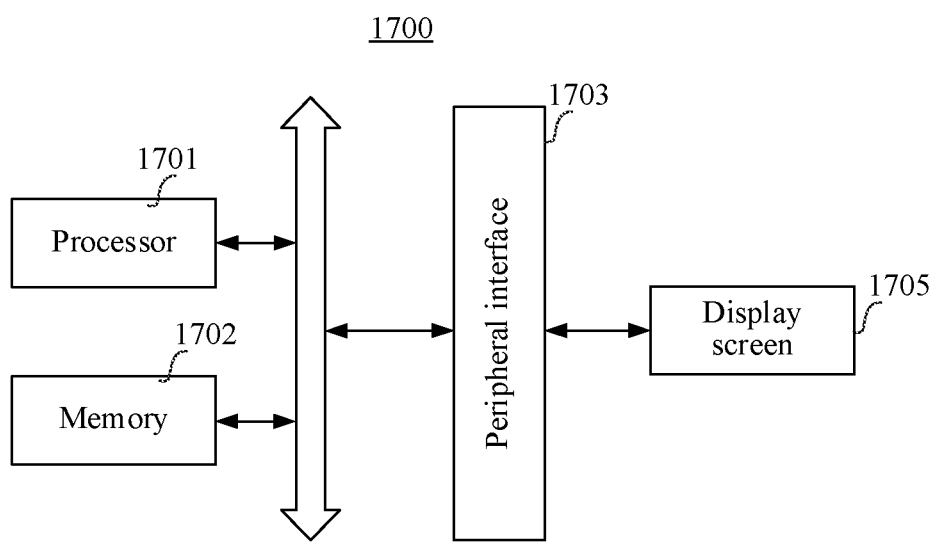
FIG. 24 is a block diagram of a terminal according to an exemplary embodiment of the present disclosure.

FIG. 24 is a structural block diagram of a terminal 1700 according to an exemplary embodiment of the present disclosure. The terminal 1700 may be: a smartphone, a tablet computer, a moving picture experts group audio layer III (MP3) player, a moving picture experts group audio layer IV (MP4) player, a notebook computer, or a desktop computer. The terminal 1700 may also be referred to by other names as user equipment, a portable terminal, a laptop terminal, a desktop terminal, etc.

Generally, the terminal 1700 includes: a processor 1701 and a memory 1702.

The processor 1701 may include one or more processing cores, such as a 4-core processor or an 8-core processor. The processor 1701 may be implemented by at least one hardware form in a digital signal processing (DSP), a field-programmable gate array (FPGA), and a programmable logic array (PLA). The processor 1701 may also include a main processor and a co-processor. The main processor is a processor for processing data in a wake-up state, also referred to as a central processing unit (CPU). The coprocessor is a low power consumption processor configured to process data in a standby state. In some embodiments, the processor 1701 may be integrated with a graphic processing unit (GPU). The GPU is configured to render and plot what needs to be displayed on a display screen. In some embodiments, the processor 1701 may also include an AI processor for processing computing operations related to machine learning.

The memory 1702 may include one or more computer-readable storage media, which may be non-transitory. The memory 1702 may also include a high-speed random access memory, as well as non-volatile memory, such as one or more disk storage devices and flash storage devices. In some embodiments, the non-transitory computer-readable storage medium in the memory 1702 is configured to store at least one instruction, and the at least one instruction being configured to be executed by the processor 1701 to implement the program trial method provided in the method embodiments of the present disclosure.

The display screen 1705 is configured to display a user interface (UI). The UI may include a graph, a text, an icon, a video, and any combination thereof. When the display screen 1705 is a touch display screen, the display screen 1705 also has the ability to collect a touch signal at or above the surface of the display screen 1705. The touch signal may be input, as a control signal, to the processor 1701 for processing. At this moment, the display screen 1705 may also be configured to provide virtual buttons and/or virtual keyboards, also referred to as soft buttons and/or soft keyboards. In some embodiments, there may be one display screen 1705 disposed on a front panel of the terminal 1700. In some other embodiments, there may be two display screens 1705 respectively arranged on different surfaces of the terminal 1700 or in a folded design. In still other embodiments, the display screen 1705 may be a flexible display screen arranged on a curved or folded surface of the terminal 1700. Even further, the display screen 1705 may be arranged in a non-rectangular irregular pattern, i.e., a special-shaped screen. The display screen 1705 may be prepared by using materials such as a liquid crystal display (LCD), an organic light-emitting diode (OLED), or the like.

It will be appreciated by those skilled in the art that the structure shown in FIG. 24 is not limiting of the terminal 1700 and may include more or fewer assemblies than illustrated, or some assemblies may be combined, or different assembly arrangements may be employed.

The memory further includes one or more programs. The one or more programs are stored in the memory. The one or more programs include a program for performing the program trial method provided in the embodiments of the present disclosure.

The present disclosure further provides a computer device. The computer device includes: a processor and a memory storing at least one instruction, at least one program, a code set, or an instruction set, the at least one instruction, the at least one program, the code set, or the instruction set being loaded and executed by the processor to implement the program trial method provided in the above method embodiments.

The present disclosure further provides a computer-readable storage medium, storing at least one instruction, at least one program, a code set, or an instruction set, the at least one instruction, the at least one program, the code set, or the instruction set being loaded and executed by a processor to implement the program trial method provided in the foregoing method embodiments.

An embodiment of the present disclosure further provides a computer program product or a computer program. The computer program product or the computer program includes computer instructions, and the computer instructions are stored in a computer-readable storage medium. A processor of a computer device reads the computer instructions from the computer-readable storage medium, and executes the computer instructions, so that the computer device performs the program trial method provided in the foregoing example implementations.

It is to be understood that "plurality of" mentioned in the specification means two or more. The "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A program trial method, performed by a terminal and comprising:
    displaying a user interface of a host program of a first game;
    in response to a trial event being triggered:
        acquiring scenario information, the scenario information comprising at least a program identifier of the host program when the trial event is triggered;
        transmitting a trial request to a cloud server, the trial request comprising the scenario information of the host program;
        receiving from the cloud server and displaying a first image frame of a cloud application corresponding to the scenario information on the user interface of the host program, the first image frame being obtained based on a first output of the cloud application loaded with a trial setting; and
    displaying a second image frame of the cloud application on the user interface of the host program, the second image frame being obtained based on a second output of the cloud application in response to an operation performed on the user interface, the cloud application being different from the first game.

2. The method according to claim 1, wherein the host program runs on the terminal, and the cloud application runs on the cloud server.

3. The method according to claim 1, wherein the trial setting corresponds to the trial event.

4. The method according to claim 1, wherein the cloud application is a cloud game different from the first game.

5. The method according to claim 4, wherein the trial setting comprises a specified game progress or a specified game scene of the cloud game corresponding to the trial event.

6. The method according to claim 1, wherein the trial setting comprises a specified function of the cloud application being enabled.

7. The method according to claim 2, wherein the cloud application is loaded with the trial setting on the cloud server before the trial event is triggered.

8. The method according to claim 1, further comprising:
    displaying a sequence of second image frames;
    in response to a stop condition being met, stopping displaying second image frames.

9. The method according to claim 8, wherein the stop condition is a predetermined duration of the cloud application being reached.

10. The method according to claim 8, wherein the stop condition is a predetermined progress of the cloud application being achieved.

11. The method according to claim 8, further comprising:
    in response to the stop condition being met, displaying a download interface for downloading an application corresponding to the cloud application.

12. The method according to claim 1, further comprising:
    decoding the first output of the cloud application to obtain a decoded image frame; and
    adjusting a parameter of the decoded image frame to obtain the first image frame.

13. The method according to claim 1, wherein the second image frame is the second output of the cloud application combined with a mask layer.

14. The method according to claim 13, wherein the mask layer comprises at least one of: text, picture, or UI control.

15. The method according to claim 1, wherein the triggering event is:
    a progress of the host program being reached; or
    a trial triggering button of the host program being clicked by a user of the host program.

16. The method according to claim 1, wherein the cloud application is determined based on correspondence relationships between program identifiers of host programs and cloud applications stored on the cloud server.

17. The method according to claim 1, wherein the scenario information further comprises channel scenario information of the host program when the trial event is triggered or an interface screenshot of the host program when the trial event is triggered; and
    different channel scenario information of the host program correspond to different first image frames of the cloud application or different cloud applications, or
    different interface screenshots of the host program correspond to different first image frames of the same cloud application or different cloud applications.

18. The method according to claim 1, wherein the trial request further comprises user information of the host program, and the cloud application or the first image frame of the cloud application is obtained based on the user information.

19. A program trial apparatus, comprising:
    a processor and a memory, the memory storing at least one computer program, and the at least one computer program being loaded and executed by the processor to implement:
    displaying a user interface of a host program of a first game;
    in response to a trial event being triggered:
        acquiring scenario information, the scenario information comprising at least a program identifier of the host program when the trial event is triggered;
        transmitting a trial request to a cloud server, the trial request comprising the scenario information of the host program;
        receiving from the cloud server and displaying a first image frame of a cloud application corresponding to the scenario information on the user interface of the host program, the first image frame being obtained based on a first output of the cloud application loaded with a trial setting; and
    displaying a second image frame of the cloud application on the user interface of the host program, the second image frame being obtained based on a second output of the cloud application in response to an operation performed on the user interface, the cloud application being different from the first game.

20. A non-transitory computer-readable storage medium, storing at least one instruction, at least one segment of program, a code set, or an instruction set, and the at least one instruction, at least one segment of program, code set, or instruction set being loaded and executed by a processor to implement:

displaying a user interface of a host program of a first game;

in response to a trial event being triggered:
  acquiring scenario information, the scenario information comprising at least a program identifier of the host program when the trial event is triggered;
  transmitting a trial request to a cloud server, the trial request comprising the scenario information of the host program;
  receiving from the cloud server and displaying a first image frame of a cloud application corresponding to the scenario information on the user interface of the host program, the first image frame being obtained based on a first output of the cloud application loaded with a trial setting; and displaying a second image frame of the cloud application on the user interface of the host program, the second image frame being obtained based on a second output of the cloud application in response to an operation performed on the user interface, the cloud application being different from the first game.

* * * * *